United States Patent
Anzai

(10) Patent No.: US 12,339,448 B2
(45) Date of Patent: Jun. 24, 2025

(54) HEAD-UP DISPLAY PROJECTOR

(71) Applicant: FUJIFILM Corporation, Tokyo (JP)

(72) Inventor: Akihiro Anzai, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 574 days.

(21) Appl. No.: 17/703,559

(22) Filed: Mar. 24, 2022

(65) Prior Publication Data

US 2022/0221718 A1 Jul. 14, 2022

Related U.S. Application Data

(63) Continuation of application No. PCT/JP2020/036115, filed on Sep. 24, 2020.

(30) Foreign Application Priority Data

Sep. 27, 2019 (JP) ................................. 2019-177881

(51) Int. Cl.
*G02B 27/01* (2006.01)
*G02B 5/30* (2006.01)

(52) U.S. Cl.
CPC ....... *G02B 27/0101* (2013.01); *G02B 5/3016* (2013.01); *G02B 5/3025* (2013.01)

(58) Field of Classification Search
None
See application file for complete search history.

(56) References Cited

U.S. PATENT DOCUMENTS

2016/0091756 A1\* 3/2016 Watano ................... G02B 5/30
349/185
2016/0357096 A1 12/2016 Ichihashi et al.
(Continued)

FOREIGN PATENT DOCUMENTS

CN 106255917 A 12/2016
EP 3 321 719 A1 5/2018
(Continued)

OTHER PUBLICATIONS

Chinese Office Action and Search Report for corresponding Chinese Application No. 202080066872.1, dated Jun. 17, 2023, with English translation.

(Continued)

*Primary Examiner* — Bao-Luan Q Le
*Assistant Examiner* — Danell L Owens
(74) *Attorney, Agent, or Firm* — Birch, Stewart, Kolasch & Birch, LLP

(57) ABSTRACT

An object is to provide a head-up display projector that uses a reflection member having a selective reflection layer and that can suppress the decrease in brightness of a projection image and the loss of color balance of a projection image even when the wavelength of a light beam has varied. The object is achieved by having: a light source for forming a projection image; and a reflection member having a selective reflection layer that reflects visible light and is constituted by two or more layers having selective reflection center wavelengths different from each other and an interference suppression layer that has a thickness of 10 μm or more, wherein in the reflection member, the interference suppression layer is located closer to the side on which light from the light source is incident than the selective reflection layer is.

20 Claims, 5 Drawing Sheets

(56) References Cited

U.S. PATENT DOCUMENTS

| | | |
|---|---|---|
| 2016/0377776 A1 | 12/2016 | Ichihashi |
| 2017/0052369 A1 | 2/2017 | Shimatani et al. |
| 2017/0111086 A1 | 4/2017 | Choi et al. |
| 2018/0143363 A1* | 5/2018 | Ichihashi .................. G02B 5/26 |
| 2020/0333598 A1 | 10/2020 | Otani et al. |

FOREIGN PATENT DOCUMENTS

| | | | |
|---|---|---|---|
| JP | 2016-173846 A | | 9/2016 |
| JP | 2017201380 A | * | 11/2017 |
| JP | 2019-132902 A | | 8/2019 |
| JP | 7059654 B2 | * | 4/2022 |
| WO | WO 2015/141759 A1 | | 9/2015 |
| WO | WO 2015/166872 A1 | | 11/2015 |
| WO | WO 2016/003090 A1 | | 1/2016 |
| WO | WO 2019/035358 A1 | | 2/2019 |
| WO | WO 2019/163969 A1 | | 8/2019 |

OTHER PUBLICATIONS

International Preliminary Report on Patentability and English translation of the Written Opinion of the International Searching Authority for International Application No. PCT/JP2020/036115, dated Apr. 7, 2022.

International Search Report (Form PCT/ISA/210) for International Application No. PCT/JP2020/036115, dated Nov. 2, 2020, with English translation.

Chinese Office Action for corresponding Chinese Application No. 202080066872.1, dated Mar. 6, 2024, with English translation.

Japanese Office Action for corresponding Japanese Application No. 2021-549000, dated Dec. 20, 2022, with English translation.

Extended European Search Report for European Application No. 20870291.0, dated Oct. 31, 2022.

* cited by examiner

HEAD-UP DISPLAY PROJECTOR

CROSS-REFERENCE TO RELATED APPLICATIONS

This application is a Continuation of PCT International Application No. PCT/JP2020/036115 filed on Sep. 24, 2020, which claims priority under 35 U.S.C. 119(a) to Japanese Patent Application No. 2019-177881 filed on Sep. 27, 2019. The above application is hereby expressly incorporated by reference, in its entirety, into the present application.

BACKGROUND OF THE INVENTION

1. Field of the Invention

The present invention relates to a projector used for a head-up display.

2. Description of the Related Art

So-called head-up displays (head-up display systems), which project a screen image on a windshield glass of a vehicle or the like to provide information to a driver, are known. In the following description, a head-up display is also referred to as a "HUD". HUD is an abbreviation of "head-up display".

A HUD allows a driver to obtain various information such as a map, a driving speed, and a vehicle state without widely moving the line of sight while seeing the outside front view, and thus the driver is expected to drive more safely while obtaining various information.

In the HUD, for example, projection light emitted from a projector is transmitted through a transmission window provided in a dashboard and projected onto a windshield glass (combiner) including a half mirror, whereby a screen image is displayed on the windshield glass.

One known cause of deterioration of the projector constituting the HUD is external light that enters from the outside.

For example, in the case of a vehicle-mounted HUD, sunlight or the like that has entered through a windshield glass travels along a path reverse to that of projection light so as to be transmitted through a transmission window provided in a dashboard, enter into the dashboard, and enter into a projector.

Due to the sunlight traveling along the path reverse to that of projection light, various members constituting the projector, such as a mirror, a polarizing plate, an intermediate image screen, and a light source (screen image forming means), are heated and deteriorated.

In the projector constituting the HUD, a plurality of mirrors are typically provided for the purpose of, for example, changing the path of projection light and increasing the path length of projection light.

Here, in the HUD projector, a cold mirror is used as a mirror for the purpose of preventing the above-described deterioration of constituent members due to sunlight. The cold mirror is a mirror that reflects visible light and transmits infrared light.

By disposing the cold mirror in the path of projection light, infrared light, which is a greatest heating source among sunlight that has entered the projector, is transmitted through the cold mirror and thus can be prevented from further traveling along the path of projection light in the reverse direction. Therefore, by using the cold mirror, members located upstream of the cold mirror in the path of projection light can be prevented from being deteriorated by sunlight.

WO2016/003090A discloses a reflection member (selective reflection plate) using a cholesteric liquid crystal layer (cholesteric liquid crystal structure) as a reflection member that can more suitably prevent, in a HUD projector, deterioration of members due to sunlight than the cold mirror.

The cholesteric liquid crystal layer is a layer formed by fixing a cholesteric liquid crystalline phase. As is well known, the cholesteric liquid crystalline phase selectively reflects light in a particular wavelength range among circularly polarized light having a particular rotational direction.

In WO2016/003090A, a reflection member having a polarized light selective reflection layer having a cholesteric liquid crystal layer that selectively reflects blue light, a cholesteric liquid crystal layer that selectively reflects green light, and a cholesteric liquid crystal layer that selectively reflects red light is used as the reflection member (selective reflection plate) constituting the projector.

By using cholesteric liquid crystal layers as a reflection member of a HUD projector, among light included in sunlight entering into the projector and traveling reversely along the path of projection light, not only infrared light but also visible light outside the selective reflection wavelength range of each cholesteric liquid crystal layer can be transmitted.

Thus, when a reflection member using a selective reflection layer having wavelength selectivity, such as a cholesteric liquid crystal layer, is used, the heating-up of members due to not only infrared light but also visible light can be prevented, and deterioration of members constituting a HUD projector due to sunlight can be more suitably reduced.

SUMMARY OF THE INVENTION

In recent years, HUDs for in-vehicle use and other uses have been required to project images with larger screen sizes. For a HUD to project an image with a larger screen size, it is suitable to use an LED or the like as a light source of a projector and form a screen image by light beam scanning.

The wavelength of a light beam varies in response to, for example, heat generated from a light source during use.

The reflectivity of a reflection member using a selective reflection layer such as a cholesteric liquid crystal layer is highly wavelength-dependent. Thus, if a reflection member using a selective reflection layer is used in a HUD projector that forms a screen image with a light beam, the reflectivity decreases when the wavelength of the light beam has varied in response to, for example, heat generated from a light source, thus resulting in, for example, a decrease in brightness of a projection image and a loss of color balance of a projection image.

An object of the present invention is to solve the foregoing problems of the related art, that is, to provide a HUD projector that uses a reflection member having a selective reflection layer such as a cholesteric liquid crystal layer and that can suppress the decrease in brightness of a projection image and the loss of color balance of a projection image even when the wavelength of a light beam has varied.

To achieve the above object, the present invention has the following configuration.

[1] A head-up display projector has:
a light source for forming a projection image; and
a reflection member having a selective reflection layer that reflects visible light and is constituted by two or more layers having selective reflection center wavelengths different from each other and an interference suppression layer that has a thickness of 10 μm or more.

In the reflection member, the interference suppression layer is located closer to the side on which light from the light source is incident than the selective reflection layer is.

[2] In the head-up display projector according to [1], reflected light of visible light incident on the selective reflection layer at an incidence angle of 45° has a half-width of 70 nm or less.

[3] In the head-up display projector according to [1] or [2], the light source emits light having a half-width of 20 nm or less.

[4] In the head-up display projector according to any one of [1] to [3], the interference suppression layer has a thickness of 40 μm or more.

[5] In the head-up display projector according to any one of [1] to [4], the selective reflection layer is a cholesteric liquid crystal layer formed by fixing a cholesteric liquid crystalline phase.

[6] In the head-up display projector according to any one of [1] to [5], the reflection member has a polarization conversion layer that converts linearly polarized light into circularly polarized light.

[7] In the head-up display projector according to [6], the polarization conversion layer has a retardation Re in a plane direction of 100 to 450 nm.

[8] In the head-up display projector according to [6] or [7], the polarization conversion layer is a layer formed by fixing a liquid crystal compound twistedly aligned at a twist angle of less than 360° along a helical axis extending in a thickness direction.

[9] In the head-up display projector according to any one of [6] to [8], the polarization conversion layer is disposed between the interference suppression layer and the selective reflection layer.

[10] In the head-up display projector according to any one of [1] to [4], the selective reflection layer is a linearly polarized light reflection layer.

The present invention can provide a HUD projector that uses a reflection member having a selective reflection layer such as a cholesteric liquid crystal layer and that can suppress the decrease in brightness of a projection image and the loss of color balance of a projection image even when the wavelength of a light beam has varied.

DESCRIPTION OF THE PREFERRED EMBODIMENTS

Figure 1:
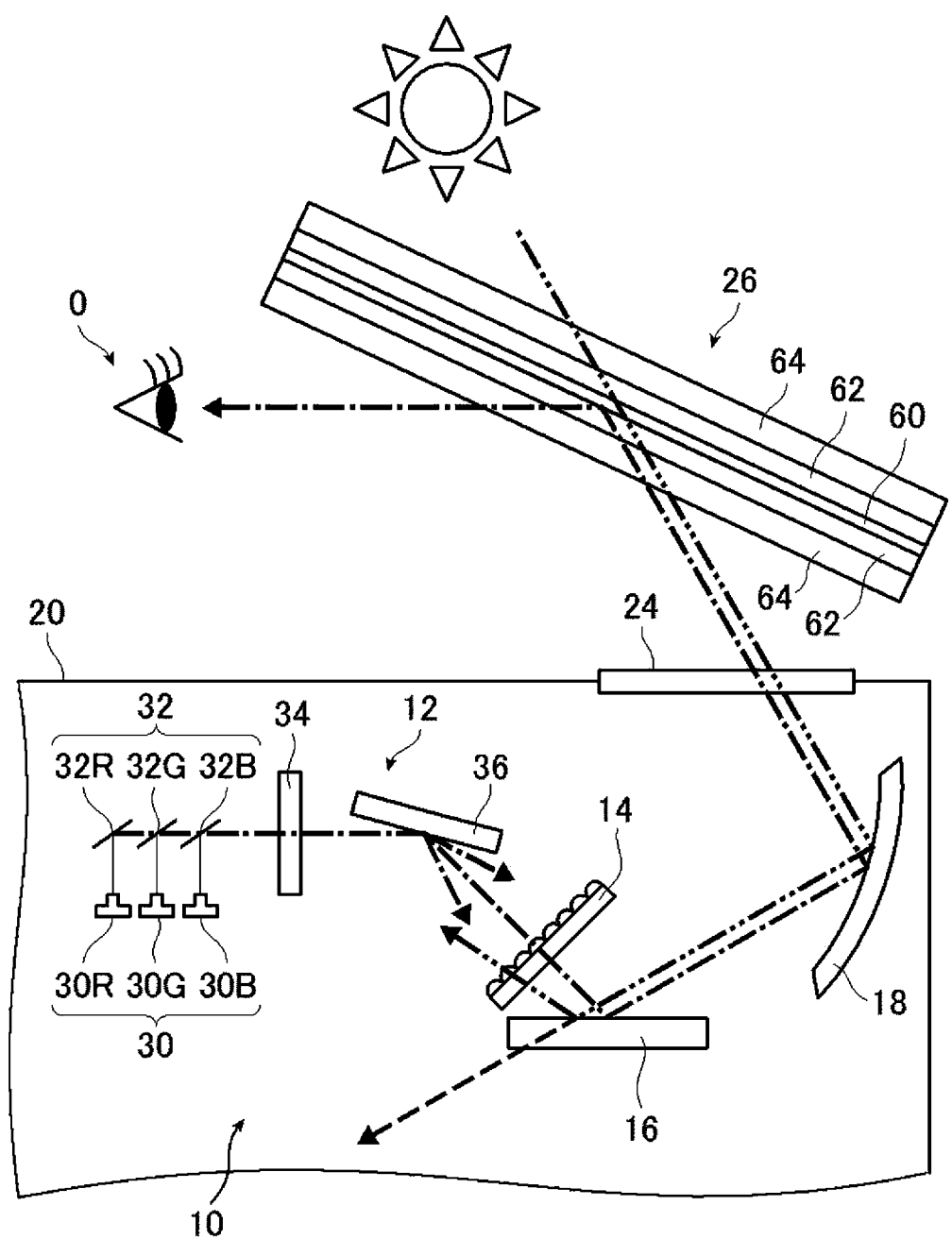
FIG. 1 schematically illustrates an example of a HUD projector of the present invention.

Hereinafter, a HUD (head-up display) projector of the present invention will be described in detail on the basis of preferred examples illustrated in the accompanying drawings.

In this specification, "to" is meant to include the numerical values before and after "to" as the lower and upper limits.

In this specification, visible light is a type of electromagnetic radiation that has wavelengths visible to the human eye and is in the wavelength range of 380 to 780 nm. Non-visible light is light in the wavelength range of less than 380 nm or the wavelength range of more than 780 nm. Among visible light, light in the wavelength range of 420 to 490 nm is blue light (B light), light in the wavelength range of 495 to 570 nm is green light (G light), and light in the wavelength range of 620 to 750 nm is red light (R light), although these values are not limitative. Furthermore, infrared light refers to non-visible light in the wavelength range of more than 780 nm and 2000 nm or less, although these values are not limitative.

In this specification, p-polarized light refers to polarized light that oscillates in a direction parallel to the plane of incidence of light. The plane of incidence refers to a plane that is vertical to the plane of reflection (e.g., windshield glass surface) and that includes incident light and reflected light. In the p-polarized light, the plane of oscillation of an electric field vector is parallel to the plane of incidence.

In this specification, in-plane phase differences (in-plane retardations Re) are measured using an AxoScan manufactured by Axometrics. Unless otherwise specified, the measurement wavelength is 550 nm.

In this specification, the term "projection image" refers to an image based on the projection of light from a projector used, but not a surrounding view such as a front view. The projection image is observed as a virtual image that emerges in an area ahead of a projection image displaying section of a windshield glass when viewed from a viewer.

In this specification, the term "screen image" refers to an image displayed on a drawing device of a projector or an image drawn on, for example, an intermediate image screen by the drawing device. As opposed to the virtual image, the screen image is a real image.

In this specification, the term "visible light transmittance" refers to a transmittance of visible light from an A light source, which is defined in JIS R 3212:2015 (Test methods of safety glazing materials for road vehicles). That is, the visible light transmittance is a transmittance determined by measuring the transmittance at wavelengths in the range of 380 to 780 nm with a spectrophotometer using an A light source, multiplying the transmittance at each wavelength by the weighting function obtained from the wavelength distribution and wavelength interval of the CM (International Commission on Illumination) photopic luminous efficiency function, and calculating a weighted average.

In this specification, a liquid crystal composition and a liquid crystal compound conceptually include those which no longer exhibit liquid crystallinity as a result of curing or the like.

The HUD projector of the present invention is a projector used for HUDs mounted on vehicles such as automobiles and trains, aircraft, ships, and the like.

FIG. 1 schematically illustrates an example of the HUD projector of the present invention.

A HUD projector 10 of the present invention illustrated in FIG. 1 has a screen image forming unit 12, an intermediate image screen 14, a reflection member 16, and a concave mirror 18.

In the following description, the HUD projector is also referred to simply as the projector.

In the HUD illustrated in FIG. 1, projection light projected by the projector 10 is transmitted through a transmission window 24 provided in a dashboard 20, projected on a windshield glass 26, and observed by a user O.

In the HUD illustrated in the figure, as in a known HUD, the user O observes a virtual image of a screen image projected on the windshield glass 26.

The HUD using the projector 10 of the present invention is not limited to a HUD (windshield HUD) that projects a projection image on the windshield glass 26 as illustrated in the figure. That is, as the HUD using the projector 10 of the present invention, various known HUDs that project a projection image on various members, such as a HUD (combiner HUD) that projects a projection image on a so-called combiner, can be used.

In the projector 10 illustrated in the figure, the screen image forming unit 12 has a light source 30, a mirror 32, a polarizing plate 34, and a light deflector 36.

The screen image forming unit 12 is a so-called light beam scanner that forms a screen image by light beam scanning.

In the screen image forming unit 12, three light beams modulated according to a screen image to be projected are emitted from the light source 30, the three light beams are combined together by the mirror 32 and converted into p-polarized light through the polarizing plate 34, and the p-polarized light is two-dimensionally scanned by the light deflector 36.

In the projector 10, a light beam modulated according to a projection image is two-dimensionally scanned by the light deflector 36 and formed into a real image by the intermediate image screen 14, and the real image is reflected by the reflection member 16 and the concave mirror 18 to travel along a predetermined optical path. As described above, this reflected light is transmitted through the transmission window 24 provided in the dashboard 20, projected onto the windshield glass 26, and observed by the user O (see the chain line).

The screen image forming unit 12 has, as the light source 30, an R light source 30R that emits a red light beam, a G light source 30G that emits a green light beam, and a B light source 30B that emits a blue light beam.

The light source 30 (the R light source 30R, the G light source 30G, and the B light source 30B) is not limited, and various light sources used for screen image formation by light beam scanning can be used.

Examples of the light source 30 include LEDs (light emitting diodes), discharge tubes, and laser light sources. The LEDs include light emitting diodes, organic light emitting diodes (OLEDs), and the like.

The half-width of light emitted from the light source 30 is not limited, but is preferably narrow to some extent.

The half-width (full width at half maximum) of light emitted from the light source 30 is preferably 20 nm or less, more preferably 15 nm or less, still more preferably 10 nm or less, particularly preferably 7 nm or less.

When the half-width of the light source 30 is 20 nm or less, a selective reflection layer having a narrow selective reflection range (reflection half-width) can be used in the reflection member 16, which will be described later, thus providing the following benefits: the advantageous effects of the present invention, i.e., deterioration of the constituent members of the projector 10 due to entrance of sunlight can be suitably prevented and a decrease in reflectivity of the reflection member due to variation of emission wavelength of the light source 30 can be prevented, can be more suitably produced, and the quality of a virtual image projected on a windshield improves.

The half-width of the light source 30 is preferably 5 nm or more because, for example, projection light can be made bright, and a virtual image projected on a windshield can be made bright.

The half-width of light emitted from the light source 30 may be measured by a known method in which wavelengths on the long-wavelength side and the short-wavelength side at 50% of a maximum brightness (maximum value) of the emitted light are determined using a spectrophotometer or the like, and the wavelength on the short-wavelength side is subtracted from the wavelength on the long-wavelength side. The half-width is preferably measured by projecting light onto a white plate and measuring reflected light with a spectrophotometer.

If the light source 30 is a commercially available light source, its catalog value may be used as the half-width.

The R light source 30R, the G light source 30G, and the B light source 30B are modulated and driven by known control means and driving means (not illustrated) according to a screen image to be projected. The light source 30 need not necessarily be directly modulated, and a light beam emitted from the light source may be modulated using a known light modulator according to a projection image.

For the modulation, known methods such as intensity modulation and pulse duration modulation can be used.

The screen image forming unit 12 illustrated in the figure performs reflection of red light, green light, and blue light so as to be equipped for a full-color projection image, but the present invention is not limited to this configuration.

That is, in the present invention, the light source 30 may have the R light source 30R and the G light source 30G alone, the R light source 30R and the B light source 30B alone, or the G light source 30G and the B light source 30B alone, so as to be equipped for a two-color projection image.

In this regard, the same applies to the mirror 32 described below.

The screen image forming unit 12 has, as the mirror 32, an R mirror 32R that reflects light emitted from the R light source 30R, a G mirror 32G that reflects light emitted from the G light source 30G, and a B mirror 32B that reflects light emitted from the B light source 30B.

The R mirror 32R is a standard light reflecting mirror used for an optical system. The G mirror 32G and the B mirror 32B are known dichroic mirrors. The G mirror 32G reflects green light and transmits light in wavelength ranges other than that of green light. The B mirror 32B reflects blue light and transmits light other than blue light.

In the screen image forming unit 12, a red light beam emitted from the R light source 30R is reflected by the R mirror 32R and transmitted through the G mirror 32G and the B mirror 32B. A green light beam emitted from the G light source 30G is reflected by the G mirror 32G and transmitted through the B mirror 32B. A blue light beam emitted from the B light source 30B is reflected by the B mirror 32B.

As a result of this, the three red, green, and blue light beams are combined into a single light beam and incident on the polarizing plate 34.

The polarizing plate 34 converts the incident light beam into p-polarized light (p-linearly polarized light).

The polarizing plate 34 is not limited, and various known linearly polarizing plates (linear polarizers) can be used.

One example of the polarizing plate 34 is a polarizing plate formed of a laminate of thin films having different refractive index anisotropies. The polarizing plate formed of a laminate of thin films having different refractive index anisotropies may be, for example, a polarizing plate described in JP1997-506837A (JP-H9-506837A). Specifically, when processing is performed under conditions selected to achieve refractive index relations, the polarizing plate can be formed using various materials.

In general, one of first materials needs to have, in a selected direction, a refractive index different from that of a second material. This difference in refractive index can be achieved by various methods including stretching during or after film formation, extrusion molding, and coating. In addition, the two materials preferably have similar rheological properties so that they can be coextruded. One example of the rheology properties is melt viscosity.

The polarizing plate formed of a laminate of thin films having different refractive index anisotropies may be a commercially available polarizing plate.

The commercially available polarizing plate may be a laminate of a reflective polarizing plate and a temporary support. Examples of commercially available polarizing plates include DBEF (manufactured by 3M) and APF (Advanced Polarizing Film (manufactured by 3M)).

The polarizing plate 34 may also be a commonly used linearly polarizing plate, such as an absorptive polarizing plate containing an iodine compound or a reflective polarizing plate such as a wire grid.

The light beam (light beam) converted into p-polarized light by the polarizing plate 34 and modulated according to a projection image is two-dimensionally scanned by the light deflector 36.

The light deflector 36 is not limited, and various known light deflectors capable of two-dimensionally scanning a light beam can be used. Examples of the light deflector 36 include galvano mirrors (galvanometer mirrors), combinations of galvano mirrors and polygon mirrors, and MEMS (micro electro mechanical systems). Among them, MEMS are suitable for use.

The method of scanning is not limited, and known light beam scanning methods such as random scanning and raster scanning can be used. Among them, raster scanning is suitable.

In the raster scanning, for example, the light beam can be moved in a horizontal direction by using a resonance frequency and in a vertical direction by using a saw-tooth wave. Screen image formation (drawing) using light beam scanning does not require a projection lens and thus helps achieve a smaller device.

In the projector 10 illustrated in the figure, the screen image forming unit 12 forms a projection image by light beam scanning, but the present invention is not limited to this screen image formation method.

That is, in the projector of the present invention, various known screen image forming means used in HUD projectors (imagers) can be used as screen image forming means. Examples of screen image forming means include vacuum fluorescent displays, LCD (liquid crystal display) and LCOS (liquid crystal on silicon), which use liquid crystal, organic electroluminescent (organic EL) displays, and DLP (digital light processing), which uses a DMD (digital micromirror device). When these screen image forming means are used, a screen image is projected through a projection lens onto the intermediate image screen 14.

In these screen image forming means, the light source in the present invention is a light source of a backlight unit in the case of LCD or LCOP, and the light source is a light source that irradiates a DMD with light in the case of DLP. In the case of an organic EL display, the display itself serves as the light source.

Projection light emitted from the screen image forming unit 12 is then formed into a real image (visible image) by the intermediate image screen 14.

The intermediate image screen 14 is not limited, and various known intermediate image screens that form a projection image into a real image in a HUD projector can be used.

Examples of the intermediate image screen 14 include scattering films, microlens arrays, and rear-projection screens. For example, in the case where the intermediate image screen 14 is made of a plastic material, if the intermediate image screen 14 exhibits birefringence, the polarization plane and light intensity of polarized light incident on the intermediate image screen 14 are disturbed, and as a result, color unevenness or the like is likely to occur in a projection image. However, this color unevenness can be reduced by using a phase difference layer having a predetermined phase difference.

The intermediate image screen 14 preferably has a function of transmitting incident projection light while diverging the projection light. This is because the function enables enlarged display of a projection image.

One example of such an intermediate image screen is an intermediate image screen constituted by a microlens array. The microarray lens used in a HUD is described in, for example, JP2012-226303A, JP2010-145745A, and JP2007-523369A.

As described above, the projection light formed into a real image by the intermediate image screen 14 is reflected by the reflection member 16 and the concave mirror 18 to travel along the predetermined optical path, transmitted through the transmission window 24 provided in the dashboard 20, projected onto the windshield glass 26, and observed by the user O (see the chain line).

The reflection member 16 is a characteristic member of the projector 10 of the present invention. The reflection member 16 will be described later in detail.

On the other hand, the concave mirror 18 is a known concave mirror used in a HUD projector that enlarges and projects projection light.

In the projector 10 illustrated in the figure, the reflection member 16 and the concave mirror 18 are used as members for changing the path of projection light, but the present invention is not limited to this configuration.

That is, the projector of the present invention may have, as a member for changing the path of projection light, the reflection member 16 alone without the concave mirror 18 or may have one or more other light reflection elements in addition to the reflection member 16 and the concave mirror 18.

As the light reflection elements, free-form surface mirrors and the like can be used as well as concave mirrors and ordinary mirrors. That is, the projector of the present invention may have any configuration in which various light reflection elements are used, as long as the reflection member of the present invention is included.

As described above, the reflection member 16 is a characteristic member of the present invention.

The reflection member 16, which also acts as a cold mirror, reflects visible light (red light, green light, and blue light) and transmits infrared light.

As described above, in a HUD for in-vehicle use or other uses, as indicated by a two-dot chain line in FIG. 1, external light such as sunlight may be transmitted through the windshield glass 26 and the transmission window 24 to enter the projector 10, and may travel along the path of projection light indicated by the chain line in the reverse direction to be incident on the intermediate image screen 14, the light deflector 36, and the polarizing plate 34. Such sunlight heats these members, resulting in deterioration of heat-sensitive members.

Here, these members are heated mainly by infrared light included in sunlight. Therefore, as the reflection member 16 has a cold mirror function to reflect visible light and transmit infrared light, infrared light in sunlight that has entered the projector 10 is transmitted through the reflection member 16 as indicated by the broken line. Therefore, the infrared light in sunlight can be prevented from being incident on the intermediate image screen 14, the light deflector 36, and the polarizing plate 34 and heating and damaging these members.

Furthermore, when the selective reflection layer of the reflection member 16 is a cholesteric liquid crystal layer, which will be described later, half of visible light included in sunlight is also transmitted through the reflection member 16, and thus the intermediate image screen 14, the light deflector 36, and the polarizing plate 34 can be more suitably prevented from being damaged by heat.

Figure 2:
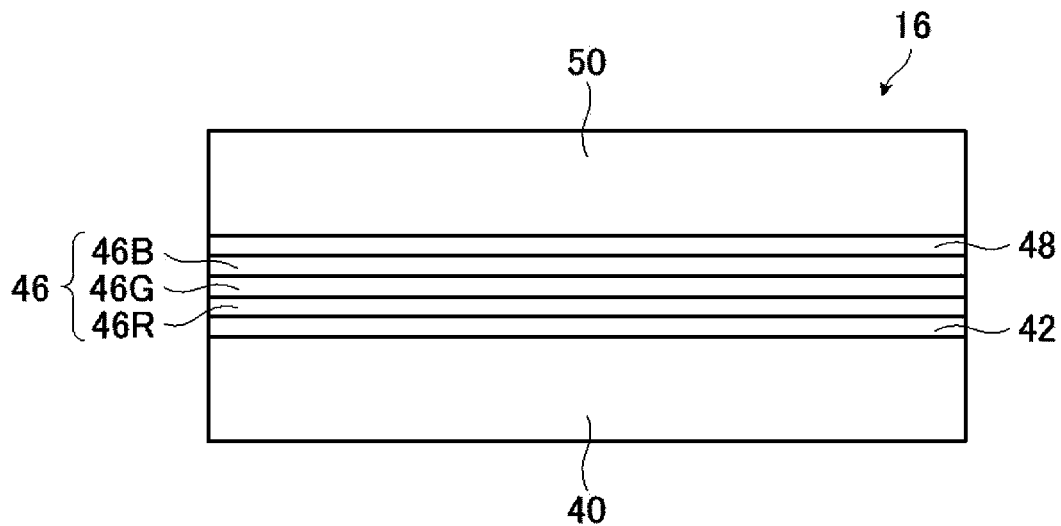
FIG. 2 schematically illustrates a reflection member of the HUD projector illustrated in FIG. 1.

FIG. 2 schematically illustrates an example of the reflection member 16.

As illustrated in FIG. 2, the reflection member 16 has a substrate 40, an adhesive layer 42, a selective reflection layer 46, a polarization conversion layer 48, and an interference suppression layer 50.

In the projector 10 of present invention, the reflection member 16 is disposed such that the interference suppression layer 50 is closer to the side on which projection light is incident than the selective reflection layer 46 is. That is, in FIG. 1, the interference suppression layer 50 is located above the selective reflection layer 46. Therefore, as will be described later, projection light incident on the reflection member 16 is transmitted through the interference suppression layer 50, and p-polarized light is converted into circularly polarized light by the polarization conversion layer 48. The circularly polarized light is reflected by the selective reflection layer 46 and restored to p-polarized light by the polarization conversion layer 48. The p-polarized light is transmitted through the interference suppression layer 50 and reflected toward the concave mirror 18.

Substrate

The substrate 40 is for supporting the selective reflection layer 46, the polarization conversion layer 48, and the interference suppression layer 50.

The substrate 40 is not limited, and various plate-like products (sheet-like products and films) that can support these layers can be used. Examples include various glass plates, resin films made of resin materials such as polyethylene terephthalate (PET), triacetyl cellulose (TAC), acrylic resins (e.g., PMMA (polymethyl methacrylate)), and cycloolefin polymers (COP), and acrylic plates.

The thickness of the substrate 40 is not limited, and a thickness sufficient to support the selective reflection layer 46, the polarization conversion layer 48, and the interference suppression layer 50 may be appropriately set according to the material forming the substrate 40.

In the projector 10 of present invention, the substrate 40 of the reflection member 16 is not an essential constituent element.

Adhesive Layer

The adhesive layer 42 is for bonding the substrate 40 and the selective reflection layer 46 to each other.

The adhesive layer 42 may be any layer formed of an adhesive.

According to the type of setting, adhesives are classified into hot melt adhesives, thermosetting adhesives, photosetting adhesives, reaction-setting adhesives, and pressure-sensitive adhesives requiring no setting. Examples of usable materials for these adhesives include compounds such as acrylate compounds, urethane compounds, urethane acrylate compounds, epoxy compounds, epoxy acrylate compounds, polyolefin compounds, modified olefin compounds, polypropylene compounds, ethylene vinyl alcohol compounds, vinyl chloride compounds, chloroprene rubber compounds, cyanoacrylate compounds, polyamide compounds, polyimide compounds, polystyrene compounds, and polyvinyl butyral compounds. From the viewpoint of workability and productivity, the type of setting is preferably photosetting. From the viewpoint of optical transparency and heat resistance, the material is preferably, for example, an acrylate compound, a urethane acrylate compound, or an epoxy acrylate compound.

The adhesive layer 42 may be formed using a high-transparency adhesive transfer tape (OCA (optical clear adhesive) tape). The high-transparency adhesive transfer tape may be a commercially available product for a screen image display device, particularly, a commercially available product for a surface of a screen image display unit of a screen image display device. Examples of such commercially available products include adhesive sheets (e.g., PD-S1) manufactured by PANAC Co., Ltd. and MHM adhesive sheets manufactured by Nichieikako Co., Ltd.

The adhesive layer 42 may have any thickness. The thickness of the adhesive layer is preferably 0.5 to 10 μm, more preferably 1.0 to 5.0 μm. The thickness of the adhesive layer 42 formed using an OCA tape may be 10 μm to 50 μm, and is preferably 15 μm to 30 μm.

Selective Reflection Layer

The selective reflection layer 46 is a layer that wavelength-selectively reflects light. Specifically, the selective reflection layer 46 is a layer that selectively reflects light in a particular wavelength range.

In the illustrated example, the selective reflection layer 46 selectively reflects light in the visible wavelength range and transmits other light such as infrared light.

The selective reflection layer 46 is preferably a polarized light reflection layer. The polarized light reflection layer is a layer that reflects linearly polarized light, circularly polarized light, or elliptically polarized light.

The polarized light reflection layer is preferably a circularly polarized light reflection layer or a linearly polarized light reflection layer. The circularly polarized light reflection layer is a layer that reflects circularly polarized light having one sense (rotational direction) and transmits circularly polarized light having the other sense in a selective reflection wavelength range. The linearly polarized light reflection layer is a layer that reflects linearly polarized light in one polarization direction and transmits linearly polarized light in a polarization direction orthogonal to the reflecting polarization direction at a selective reflection center wavelength.

The polarized light reflection layer can transmit unreflected polarized light. Therefore, using the polarized light reflection layer allows light to be partly transmitted even in the wavelength range in which the selective reflection layer 46 exhibits reflection.

The selective reflection layer 46 is preferably a circularly polarized light reflection layer, particularly preferably a cholesteric liquid crystal layer formed by fixing a cholesteric liquid crystalline phase.

As a preferred example, the selective reflection layer 46 of the reflection member 16 illustrated in FIG. 2 has a red-reflecting cholesteric liquid crystal layer 46R having a selective reflection center wavelength in the red light wavelength range, a green-reflecting cholesteric liquid crystal layer 46G having a selective reflection center wavelength in the green light wavelength range, and a blue-reflecting cholesteric liquid crystal layer 46B having a selective reflection center wavelength in the blue light wavelength range when the incidence angle is 45°.

The selective reflection center wavelength of each cholesteric liquid crystal layer is preferably within ±20 nm of, more preferably within ±10 nm of, still more preferably equal to the peak wavelength of a light source that emits a corresponding light beam among the light source 30 described above. In this regard, the same applies to the linearly polarized light reflection layer described later.

The reflection member 16 illustrated in the figure performs reflection of red light, green light, and blue light so as to be equipped for a full-color projection image, but the present invention is not limited to this configuration.

That is, in the present invention, the selective reflection layer 46 of the reflection member may have the red-reflecting cholesteric liquid crystal layer 46R and the green-reflecting cholesteric liquid crystal layer 46G alone, the red-reflecting cholesteric liquid crystal layer 46R and the blue-reflecting cholesteric liquid crystal layer 46B alone, or the green-reflecting cholesteric liquid crystal layer 46G and the blue-reflecting cholesteric liquid crystal layer 46B alone, so as to be equipped for a two-color projection image. Alternatively, the selective reflection layer 46 may have three or more cholesteric liquid crystal layers.

That is, in the present invention, any reflection member may be used as long as it has two or more cholesteric liquid crystal layers (selective reflection layers) having different selective reflection center wavelengths.

In this regard, the same applies to the linearly polarized light reflection layer described later.

Cholesteric Liquid Crystal Layer (Circularly Polarized Light Reflection Layer)

A cholesteric liquid crystal layer means a layer formed by fixing a cholesteric liquid crystalline phase.

The cholesteric liquid crystal layer may be any layer in which the alignment of a liquid crystal compound forming a cholesteric liquid crystalline phase is maintained. Typically, the cholesteric liquid crystal layer may be a layer that is formed by bringing a polymerizable liquid crystal compound into the state of cholesteric liquid crystalline phase alignment and then polymerizing and curing the compound, for example, by ultraviolet irradiation and heating, so that the layer has no fluidity and at the same time undergoes no change in its alignment state when acted upon by an external field or an external force. In the cholesteric liquid crystal layer, it is only necessary that the optical properties of the cholesteric liquid crystalline phase be maintained in the layer, and the liquid crystal compound in the layer need not exhibit liquid crystallinity. For example, the polymerizable liquid crystal compound may lose its liquid crystallinity as a result of an increase in molecular weight due to curing reaction.

The cholesteric liquid crystalline phase is known to exhibit circularly polarized light selective reflection, that is, to selectively reflect circularly polarized light having one sense, either right-handed circularly polarized light or left-handed circularly polarized light, and transmit circularly polarized light having the other sense.

As films including layers in which such cholesteric liquid crystalline phases that exhibit circularly polarized light selective reflection are fixed, many films formed of compositions including polymerizable liquid crystal compounds have been known. The cholesteric liquid crystal layer can be found in the related art.

The center wavelength of selective reflection (selective reflection center wavelength) $\lambda$ of the cholesteric liquid crystal layer depends on the helical pitch P (=helical period) of the helical structure (helical alignment structure) in a cholesteric liquid crystalline phase and satisfies the relation $\lambda = n \times P$, where n is an average refractive index of the cholesteric liquid crystal layer. As is clear from this formula, the selective reflection center wavelength can be controlled by adjusting the n value and/or the P value.

In other words, the helical pitch P (one helical pitch) of the helical structure is a length of one turn of the helix in the helical axis direction. That is, the helical pitch P is a length in the helical axis direction where a director of the liquid crystal compound forming the cholesteric liquid crystalline phase rotates 360°. The director of the liquid crystal compound is, for example, a longitudinal direction in the case of a rod-like liquid crystal. The helical axis direction of a typical cholesteric liquid crystal layer is identical to the thickness direction of the cholesteric liquid crystal layer.

When a section of the cholesteric liquid crystal layer is observed under a scanning electron microscope (SEM), a streak pattern derived from the cholesteric liquid crystalline phase and having bright lines (bright portions) and dark lines (dark portions) alternating with each other in the thickness direction is observed.

The helical pitch P of the cholesteric liquid crystal layer is twice the distance between the bright lines. In other words, the helical pitch P of the cholesteric liquid crystal layer is equal to the length of three bright lines and two dark lines in the thickness direction, that is, the length of three dark lines and two bright lines in the thickness direction. This length is the center-to-center distance between the upper and lower bright or dark lines in the thickness direction.

The selective reflection center wavelength and the half-width (full width at half maximum) of the cholesteric liquid crystal layer can be determined, for example, as described below.

A reflection spectrum of the cholesteric liquid crystal layer is measured in the normal direction using a spectrophotometer (manufactured by JASCO Corporation, V-670). In the reflection spectrum, a peak of transmittance decrease is observed in the selective reflection region. Of two wavelengths at the middle (average) transmittance between the minimum transmittance of this peak and the transmittance before decrease, the shorter wavelength is defined as $\lambda_l$ (nm), and the longer wavelength as $\lambda_h$ (nm). The selective reflection center wavelength $\lambda$ and the half-width $\Delta\lambda$ can be expressed by the following formula.

$$\lambda = (\lambda_l + \lambda_h)/2 \Delta\lambda = (\lambda_h - \lambda_l)$$

The selective reflection center wavelength determined as described above is substantially equal to the wavelength at the barycentric position of the reflection peak of the circularly polarized light reflection spectrum measured in the normal direction of the cholesteric liquid crystal layer.

The helical pitch of the cholesteric liquid crystalline phase depends on the type of chiral agent used together with the polymerizable liquid crystal compound and the concentration of the chiral agent added, and thus the desired pitch can be achieved by controlling the type and the concentration. The sense and pitch of a helix can be measured by using methods described in page 46 of "Ekisho Kagaku Jikken Nyumon (Introduction of Liquid Crystal Chemical Experiments)" edited by The Japanese Liquid Crystal Society, published by SIGMA SHUPPAN, 2007 and page 196 of "Handbook of Liquid Crystals" edited by the Editorial Board of the Handbook of Liquid Crystals, published by Maruzen Co., Ltd.

In the reflection member, cholesteric liquid crystal layers are preferably disposed, from the light beam incident side, in the order of layers having shorter selective reflection center wavelengths.

Each cholesteric liquid crystal layer has either a right-handed or left-handed helical sense. The sense of circularly polarized light reflected by the cholesteric liquid crystal layers is identical to the helical sense. The sense of circularly polarized light means the rotational direction of the circularly polarized light.

Preferably, the plurality of cholesteric liquid crystal layers having different selective reflection center wavelengths have the same helical sense, that is, reflect circularly polarized light having the same rotational direction.

The half-width $\Delta\lambda$ (nm) of a selective reflection band in which selective reflection is exhibited depends on the birefringence $\Delta n$ of the liquid crystal compound and the pitch P described above and satisfies the relation $\Delta\lambda=\Delta n \times P$. Thus, the width of the selective reflection band can be controlled by adjusting $\Delta n$. The adjustment of $\Delta n$ can be performed by adjusting the types or mixing ratio of polymerizable liquid crystal compounds or by controlling the temperature during alignment fixation.

To form cholesteric liquid crystal layers of the same type having the same selective reflection center wavelength, a plurality of cholesteric liquid crystal layers having the same pitch P and the same helical sense may be laminated. By laminating cholesteric liquid crystal layers having the same pitch P and the same helical sense, the selectivity of circularly polarized light at a particular wavelength can be increased.

The plurality of cholesteric liquid crystal layers constituting the selective reflection layer 46 may be formed by laminating separately formed cholesteric liquid crystal layers by using an adhesive or the like or by applying a liquid crystal composition (coating liquid) including a polymerizable liquid crystal compound and the like directly onto a surface of a cholesteric liquid crystal layer previously formed by a method described later and repeating alignment and fixing steps. The latter is preferred.

This is because by forming the next cholesteric liquid crystal layer directly on a surface of the previously formed cholesteric liquid crystal layer, the alignment direction of liquid crystal molecules of the previously formed cholesteric liquid crystal layer on the air interface side and the alignment direction of the liquid crystal molecules on the lower side of the cholesteric liquid crystal layer formed on the previously formed cholesteric liquid crystal layer become coincident with each other, thus providing a laminate of cholesteric liquid crystal layers with good polarization properties. In addition, uneven interference that may occur due to an uneven thickness of the adhesive layer will not be observed.

The thickness of each cholesteric liquid crystal layer is preferably 0.2 to 10 μm, more preferably 0.3 to 8.0 μm, still more preferably 0.5 to 6.0 μm.

The total thickness of the cholesteric liquid crystal layers is preferably 1.0 to 30 μm, more preferably 2.5 to 25 μm, still more preferably 3.0 to 20 μm.

Method for Producing Cholesteric Liquid Crystal Layer

Hereinafter, materials and a method for producing the cholesteric liquid crystal layer will be described.

Examples of materials used to form the cholesteric liquid crystal layer described above include a liquid crystal composition including a polymerizable liquid crystal compound and a chiral agent (optically active compound). The liquid crystal composition, which may optionally be mixed with, for example, a surfactant and a polymerization initiator and dissolved in a solvent or the like, is applied to, for example, a support, an alignment film, or a cholesteric liquid crystal layer to serve as an underlayer. After cholesteric alignment is matured, the alignment is fixed by curing the liquid crystal composition, whereby a cholesteric liquid crystal layer can be formed.

Polymerizable Liquid Crystal Compound

The polymerizable liquid crystal compound may be a rod-like liquid crystal compound or a disk-like liquid crystal compound, and is preferably a rod-like liquid crystal compound.

The rod-like polymerizable liquid crystal compound for forming the cholesteric liquid crystal layer may be, for example, a rod-like nematic liquid crystal compound. Preferred examples of rod-like nematic liquid crystal compounds include azomethines, azoxies, cyanobiphenyls, cyanophenyl esters, benzoic acid esters, cyclohexanecarboxylic acid phenyl esters, cyanophenyl cyclohexanes, cyano-substituted phenylpyrimidines, alkoxy-substituted phenylpyrimidines, phenyldioxanes, tolans, and alkenyl cyclohexyl benzonitriles. Not only low-molecular-weight liquid crystal compounds but also high-molecular-weight liquid crystal compounds can be used.

The polymerizable liquid crystal compound is obtained by introducing a polymerizable group into a liquid crystal compound. Examples of the polymerizable group include unsaturated polymerizable groups, an epoxy group, and an aziridinyl group. Unsaturated polymerizable groups are preferred, and ethylenically unsaturated polymerizable groups are particularly preferred. The polymerizable group can be introduced into molecules of a liquid crystal compound by various methods. The number of polymerizable groups in one molecule of the polymerizable liquid crystal compound is preferably 1 to 6, more preferably 1 to 3.

Examples of the polymerizable liquid crystal compound include compounds described in Makromol. Chem., vol. 190, p. 2255 (1989), Advanced Materials, vol. 5, p. 107 (1993), U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-117-110469A), JP 1999-080081A (JP-H11-080081A), and JP2001-328973A. Two or more polymerizable liquid crystal compounds may be used in combination. Combined use of two or more polymerizable liquid crystal compounds enables alignment at lower temperatures.

The amount of polymerizable liquid crystal compound in the liquid crystal composition is preferably 80 to 99.9 mass %, more preferably 85 to 99.5 mass %, still more preferably 90 to 99 mass %, relative to the mass of solids (the mass excluding the mass of solvent) in the liquid crystal composition.

To improve the visible light transmittance, the cholesteric liquid crystal layer may have low Δn. The cholesteric liquid crystal layer having low Δn can be formed by using a low-Δn polymerizable liquid crystal compound. Hereinafter, the low-Δn polymerizable liquid crystal compound will be specifically described.

Low-Δn Polymerizable Liquid Crystal Compound

A cholesteric liquid crystalline phase is formed by using a low-Δn polymerizable liquid crystal compound and fixed to form a film, whereby a narrow-band selective reflection layer can be obtained. Examples of the low-Δn polymerizable liquid crystal compound include compounds described in WO2015/115390, WO2015/147243, WO2016/035873, JP2015-163596A, and JP2016-053149A. For liquid crystal compositions that provide selective reflection layers having small half-widths, reference can be made to the description in WO2016/047648.

The liquid crystal compound may be a polymerizable compound in WO2016/047648 represented by formula (I) below.

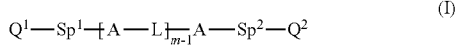
(I)

In formula (I), A represents an optionally substituted phenylene group or an optionally substituted trans-1,4-cyclohexylene group, L represents a linking group selected from the group consisting of a single bond, —CH$_2$O—, —OCH$_2$—, —(CH$_2$)$_2$OC(=O)—, —C(=O)O(CH$_2$)$_2$—, —C(=O)O—, —OC(=O)O—, —CH=CH—C(=O)O—, and —OC(=O)—CH=CH—, m represents an integer of 3 to 12, Sp$^1$ and Sp$^2$ each independently represent a linking group selected from the group consisting of a single bond, a linear or branched alkylene group having 1 to 20 carbon atoms, and a group in which one or more than one —CH$_2$— moiety in a linear or branched alkylene group having 1 to 20 carbon atoms is substituted with —O—, —S—, —NH—, —N(CH$_3$)—, —C(=O)—, —OC(=O)—, or —C(=O)O—, and Q$^1$ and Q$^2$ each independently represent a hydrogen atom or a polymerizable group selected from the group consisting of groups represented by formula Q-1 to formula Q-5 below, provided that one of Q$^1$ and Q$^2$ represents a polymerizable group.

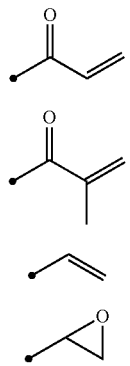

Q-1

Q-2

Q-3

Q-4

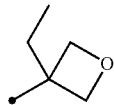

Q-5

The phenylene group in formula (I) is preferably a 1,4-phenylene group.

The substituents in the "optionally substituted" phenylene group and the "optionally substituted" trans-1,4-cyclohexylene group are not particularly limited, and examples include an alkyl group, a cycloalkyl group, an alkoxy group, an alkyl ether group, an amide group, an amino group, a halogen atom, and a substituent selected from the group consisting of groups obtained by combining two or more of these substituents. Examples of the substituents also include substituents represented by —C(O)—X$^3$-Sp$^3$-Q$^3$, which will be described later. The phenylene group and the trans-1,4-cyclohexylene group may have 1 to 4 substituents. When these groups have two or more substituents, the two or more substituents may be the same or different.

The alkyl group may be a linear or branched alkyl group. The number of carbon atoms of the alkyl group is preferably 1 to 30, more preferably 1 to 10, still more preferably 1 to 6. Examples of the alkyl group include a methyl group, an ethyl group, a n-propyl group, an isopropyl group, a n-butyl group, an isobutyl group, a sec-butyl group, a tert-butyl group, a n-pentyl group, an isopentyl group, a neopentyl group, a 1,1-dimethylpropyl group, a n-hexyl group, an isohexyl group, a linear or branched heptyl group, an octyl group, a nonyl group, a decyl group, an undecyl group, and a dodecyl group. The above description regarding the alkyl group also applies to the alkoxy group, which includes an alkyl group. Specific examples of the alkylene group include divalent groups obtained by removing any one hydrogen atom from each of the above examples of the alkyl group. Examples of the halogen atom include a fluorine atom, a chlorine atom, a bromine atom, and an iodine atom.

The number of carbon atoms of the cycloalkyl group is preferably 3 to 20, more preferably 5 or more, and preferably 10 or less, more preferably 8 or less, still more preferably 6 or less. Examples of the cycloalkyl group include a cyclopropyl group, a cyclobutyl group, a cyclopentyl group, a cyclohexyl group, a cycloheptyl group, and a cyclooctyl group.

The substituent that the phenylene group and the trans-1,4-cyclohexylene group may have is particularly preferably a substituent selected from the group consisting of an alkyl group, an alkoxy group, and —C(=O)—X$^3$-Sp$^3$-Q$^3$. Here, X$^3$ represents a single bond, —O—, —S—, or —N(Sp$^4$-Q$^4$)-, or represents a nitrogen atom that forms a ring structure together with Q$^3$ and Sp$^3$. Sp$^3$ and Sp$^4$ each independently represent a linking group selected from the group consisting of a single bond, a linear or branched alkylene group having 1 to 20 carbon atoms, and a group in which one or more than one —CH$_2$— moiety in a linear or branched alkylene group having 1 to 20 carbon atoms is substituted with —O—, —S—, —NH—, —N(CH$_3$)—, —C(=O)—, —OC(=O)—, or —C(=O)O—.

Q$^3$ and Q$^4$ each independently represent a hydrogen atom, a cycloalkyl group, a group in which one or more than one —CH$_2$— moiety in a cycloalkyl group is substituted with —O—, —S—, —NH—, —N(CH$_3$)—, —C(=O)—, —OC(=O)—, or —C(=O)O—, or a polymerizable group selected from the group consisting of the groups represented by formula Q-1 to formula Q-5.

Specific examples of the group in which one or more than one —$CH_2$— moiety in a cycloalkyl group is substituted with —O—, —S—, —NH—, —N($CH_3$)—, —C(=O)—, —OC(=O)—, or —C(=O)O— include a tetrahydrofuranyl group, a pyrrolidinyl group, an imidazolidinyl group, a pyrazolidinyl group, a piperidyl group, a piperazinyl group, and a morpholinyl group. The substitution position is not particularly limited. Of these, a tetrahydrofuranyl group is preferred, and a 2-tetrahydrofuranyl group is particularly preferred.

In formula (I), L represents a linking group selected from the group consisting of a single bond, —$CH_2$O—, —O$CH_2$—, —($CH_2$)$_2$OC(=O)—, —C(=O)O($CH_2$)$_2$—, —C(=O)O—, —OC(=O)—, —OC(O)O—, —CH=CH—C(=O)O—, and —OC(=O)—CH=CH—. L is preferably —C(=O)O— or —OC(=O)—. L in the number of m-1 may be the same or different.

$Sp^1$ and $Sp^2$ each independently represent a linking group selected from the group consisting of a single bond, a linear or branched alkylene group having 1 to 20 carbon atoms, and a group in which one or more than one —$CH_2$— moiety in a linear or branched alkylene group having 1 to 20 carbon atoms is substituted with —O—, —S—, —NH—, —N($CH_3$)—, —C(=O)—, —OC(=O)—, or —C(=O)O—. $Sp^1$ and $Sp^2$ are preferably each independently a linear alkylene group that has 1 to 10 carbon atoms and has terminals to each of which a linking group selected from the group consisting of —O—, —OC(=O)—, and —C(=O)O— is bonded or a linking group obtained by combining one or more groups selected from the group consisting of —OC(=O)—, —C(=O)O—, —O—, and a linear alkylene group having 1 to 10 carbon atoms. Preferably, $Sp^1$ and $Sp^2$ are each a linear alkylene group that has 1 to 10 carbon atoms and has terminals to each of which —O— is bonded.

$Q^1$ and $Q^2$ each independently represent a hydrogen atom or a polymerizable group selected from the group consisting of the groups represented by formula Q-1 to formula Q-5 above, provided that one of $Q^1$ and $Q^2$ represents a polymerizable group.

The polymerizable group is preferably an acryloyl group (formula Q-1) or a methacryloyl group (formula Q-2).

In formula (I), m represents an integer of 3 to 12. m is preferably an integer of 3 to 9, more preferably an integer of 3 to 7, still more preferably an integer of 3 to 5.

The polymerizable compound represented by formula (I) preferably includes, as A, at least one optionally substituted phenylene group and at least one optionally substituted trans-1,4-cyclohexylene group. The polymerizable compound represented by formula (I) preferably includes, as A, 1 to 4 optionally substituted trans-1,4-cyclohexylene groups, more preferably 1 to 3 optionally substituted trans-1,4-cyclohexylene groups, still more preferably 2 or 3 optionally substituted trans-1,4-cyclohexylene groups. The polymerizable compound represented by formula (I) preferably includes, as A, one or more optionally substituted phenylene groups, more preferably 1 to 4 optionally substituted phenylene groups, still more preferably 1 to 3 optionally substituted phenylene groups, particularly preferably 2 or 3 optionally substituted phenylene groups.

In formula (I), when mc is a number obtained by dividing the number of trans-1,4-cyclohexylene groups represented by A by m, mc preferably satisfies 0.1<mc<0.9, more preferably 0.3<mc<0.8, still more preferably 0.5<mc<0.7. The liquid crystal composition may also include a polymerizable compound represented by formula (I) and satisfying 0.1<mc<0.3 in addition to a polymerizable compound represented by formula (I) and satisfying 0.5<mc<0.7.

Specific examples of the polymerizable compound represented by formula (I) include compounds described in paragraphs 0051 to 0058 in WO2016/047648A and compounds described in JP2013-112631A, JP2010-070543A, JP4725516B, WO2015/115390A, WO2015/147243A, WO2016/035873A, JP2015-163596A, and JP2016-053149A.

Chiral Agent: Optically Active Compound

The chiral agent has a function of inducing a helical structure of a cholesteric liquid crystal phase. The chiral compound may be selected according to the purpose because the helical sense or helical pitch to be induced varies depending on the compound.

The chiral agent is not particularly limited, and known compounds can be used. Examples of the chiral agent include compounds described in Liquid Crystal Device Handbook (chapter 3, section 4-3, Chiral Agent for TN and STN, p. 199, edited by 142nd Committee of Japan Society for the Promotion of Science, 1989), JP2003-287623A, JP2002-302487A, JP2002-080478A, JP2002-080851A, JP2010-181852A, and JP2014-034581A.

Although chiral agents generally include asymmetric carbon atoms, axial asymmetric compounds or planar asymmetric compounds, which include no asymmetric carbon atoms, can also be used as chiral agents. Examples of axial asymmetric compounds or planar asymmetric compounds include binaphthyls, helicenes, paracyclophanes, and derivatives thereof.

The chiral agent may have a polymerizable group. When the chiral agent and the liquid crystal compound each have a polymerizable group, a polymer having a repeating unit derived from the polymerizable liquid crystal compound and a repeating unit derived from the chiral agent can be formed by the polymerization reaction between the polymerizable chiral agent and the polymerizable liquid crystal compound. In this case, the polymerizable group of the polymerizable chiral agent is preferably the same type of group as the polymerizable group of the polymerizable liquid crystal compound. Therefore, the polymerizable group of the chiral agent is also preferably an unsaturated polymerizable group, an epoxy group, or an aziridinyl group, more preferably an unsaturated polymerizable group, particularly preferably an ethylenically unsaturated polymerizable group.

The chiral agent may be a liquid crystal compound.

Preferred examples of the chiral agent include isosorbide derivatives, isomannide derivatives, and binaphthyl derivatives. Commercially available isosorbide derivatives such as LC756 manufactured by BASF may be used.

The content of the chiral agent in the liquid crystal composition is preferably 0.01 to 200 mol %, more preferably 1 to 30 mol %, relative to the amount of the polymerizable liquid crystal compound. The content of the chiral agent in the liquid crystal composition means the concentration (mass %) of the chiral agent relative to the total solids content of the composition.

Polymerization Initiator

The liquid crystal composition preferably contains a polymerization initiator. In the case where polymerization reaction is caused to proceed through ultraviolet irradiation, the polymerization initiator used is preferably a photopolymerization initiator capable of initiating polymerization reaction through ultraviolet irradiation.

Examples of the photopolymerization initiator include α-carbonyl compounds (described in U.S. Pat. Nos. 2,367,661A and 2,367,670A), acyloin ethers (described in U.S.

Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of triarylimidazole dimers and p-aminophenyl ketone (described in U.S. Pat. No. 3,549,367A), acridine and phenazine compounds (described in JP1985-105667A (JP-S60-105667A) and U.S. Pat. No. 4,239,850A), acylphosphine oxide compounds (JP1988-040799B (JP-S63-040799B), JP1993-029234B (JP-H5-029234B), JP1998-095788A (JP-H10-095788A), and JP1998-029997A (JP-H10-029997A), JP2001-233842A, JP2000-080068A, JP2006-342166A, JP2013-114249A, JP2014-137466A, JP4223071B, JP2010-262028A, and JP2014-500852A), oxime compounds (described in JP2000-066385A and JP4454067B), and oxadiazole compounds (described in U.S. Pat. No. 4,212,970A). For example, the description in paragraphs 0500 to 0547 of JP2012-208494A can also be taken into consideration.

The polymerization initiator is also preferably an acylphosphine oxide compound or an oxime compound.

The acylphosphine oxide compound may be, for example, a commercially available IRGACURE 819 (compound name: bis(2,4,6-trimethylbenzoyl)-phenylphosphine oxide) manufactured by BASF Japan. Examples of the oxime compound include commercially available products such as IRGACURE OXE01 (manufactured by BASF), IRGACURE OXE02 (manufactured by BASF), TR-PBG-304 (manufactured by Changzhou Tronly New Electronic Materials Co., Ltd.), and ADEKA ARKLS NCI-831 and ADEKA ARKLS NCI-930 (manufactured by ADEKA Corporation).

The polymerization initiators may be used alone or in combination of two or more.

The content of the photopolymerization initiator in the liquid crystal composition is preferably 0.1 to 20 mass %, more preferably 0.5 to 5 mass %, relative to the content of the polymerizable liquid crystal compound.

Crosslinking Agent

The liquid crystal composition may optionally contain a crosslinking agent to improve the film hardness and durability after curing. Crosslinking agents that are curable by, for example, ultraviolet rays, heat, or moisture are suitable for use.

The crosslinking agent is not particularly limited and can be appropriately selected according to the purpose. Examples of the crosslinking agent include polyfunctional acrylate compounds such as trimethylolpropane tri(meth)acrylate and pentaerythritol tri(meth)acrylate; epoxy compounds such as glycidyl (meth)acrylate and ethylene glycol diglycidyl ether; aziridine compounds such as 2,2-bishydroxymethylbutanol-tris[3-(1-aziridinyl)propionate] and 4,4-bis(ethyleneiminocarbonylamino)diphenylmethane; isocyanate compounds such as hexamethylene diisocyanate and biuret-type isocyanate; polyoxazoline compounds having oxazoline side groups; and alkoxysilane compounds such as vinyltrimethoxysilane and N-(2-aminoethyl)3-aminopropyltrimethoxysilane. In addition, a known catalyst can be used according to the reactivity of the crosslinking agent. This can improve the productivity in addition to the film hardness and the durability. These may be used alone or in combination of two or more.

The content of the crosslinking agent is preferably 3 to 20 mass %, more preferably 5 to 15 mass %. When the content of the crosslinking agent is 3 mass % or more, the crosslink density can be improved. When the content of the crosslinking agent is 20 mass % or less, deterioration of the stability of the cholesteric liquid crystal layer can be prevented.

The term "(meth)acrylate" is used to mean "one or both of acrylate and methacrylate".

Alignment Controlling Agent

The liquid crystal composition may contain an alignment controlling agent which contributes to stably or rapidly providing a cholesteric liquid crystal layer having planar alignment. Examples of the alignment controlling agent include fluorine (meth)acrylate polymers described in paragraphs [0018] to [0043] of JP2007-272185A, compounds represented by formulae (I) to (IV) described in paragraphs [0031] to [0034] of JP2012-203237A, and compounds described in JP2013-113913A.

The alignment controlling agents may be used alone or in combination of two or more.

The amount of the alignment controlling agent in the liquid crystal composition is preferably 0.01 to 10 mass %, more preferably 0.01 to 5 mass %, still more preferably 0.02 to 1 mass %, relative to the total mass of the polymerizable liquid crystal compound.

Other Additives

The liquid crystal composition may further contain at least one selected from the group consisting of various additives such as surfactants for adjusting the surface tension of a coating to make the thickness uniform and polymerizable monomers. The liquid crystal composition may further optionally contain, for example, a polymerization inhibitor, an antioxidant, an ultraviolet absorber, a light stabilizer, a coloring material, and fine metal oxide particles to the degree that the optical performance is not degraded.

The cholesteric liquid crystal layer can be formed by the following method. A liquid crystal composition prepared by dissolving a polymerizable liquid crystal compound, a polymerization initiator, an optionally added chiral agent, an optionally added surfactant, and the like in a solvent is applied onto the interference suppression layer 50, an alignment film, the polarization conversion layer 48, a previously produced cholesteric liquid crystal layer, or the like, and dried to obtain a coating. The coating is irradiated with active rays to polymerize the cholesteric liquid crystal composition. Thus, a cholesteric liquid crystal layer whose cholesteric regularity is fixed is obtained.

A laminated film constituted by a plurality of cholesteric liquid crystal layers can be formed by repeating the above process for producing a cholesteric liquid crystal layer.

Solvent

The solvent used for preparing the liquid crystal composition is not particularly limited. The solvent can be appropriately selected according to the purpose, and an organic solvent is preferably used.

The organic solvent is not particularly limited and can be appropriately selected according to the purpose. Examples include ketones, alkyl halides, amides, sulfoxides, heterocyclic compounds, hydrocarbons, esters, and ethers. These may be used alone or in combination of two or more. Of these, ketones are particularly preferred in view of environmental impact.

Coating, Alignment, and Polymerization

The method of applying the liquid crystal composition to a support, an alignment film, a cholesteric liquid crystal layer to serve as an underlayer, and the like is not particularly limited, and can be appropriately selected according to the purpose. Examples of coating methods include wire bar coating, curtain coating, extrusion coating, direct gravure coating, reverse gravure coating, die coating, spin coating, dip coating, spray coating, and slide coating. Alternatively, a liquid crystal composition that has been applied onto another support may be transferred.

By heating the applied liquid crystal composition, liquid crystal molecules are aligned. The heating temperature is preferably 200° C. or lower, more preferably 130° C. or lower. This alignment treatment provides an optical thin film in which the polymerizable liquid crystal compound is twistedly aligned so as to have a helical axis in a direction substantially perpendicular to the film surface.

The aligned liquid crystal compound can be further polymerized to cure the liquid crystal composition. The polymerization may be thermal polymerization or photopolymerization that uses irradiation with light, and is preferably photopolymerization. The irradiation with light is preferably performed by using ultraviolet rays. The irradiation energy is preferably 20 mJ/cm$^2$ to 50 J/cm$^2$, more preferably 100 to 1,500 mJ/cm$^2$.

To promote the photopolymerization reaction, the irradiation with light may be performed under heating conditions or in a nitrogen atmosphere. The wavelength of ultraviolet rays applied is preferably 350 to 430 nm. The rate of polymerization reaction is preferably as high as possible from the viewpoint of stability, and is preferably 70% or more, more preferably 80% or more. The rate of polymerization reaction can be determined by measuring the consumption rate of polymerizable functional groups by using an infrared absorption spectrum.

Linearly Polarized Light Reflection Layer

In the reflection member 16 constituting the projector 10 of the present invention, the selective reflection layer may be a linearly polarized light reflection layer.

The linearly polarized light reflection layer may be, for example, a polarizing plate formed of a laminate of thin films having different refractive index anisotropies. Such a polarizing plate has a high visible light transmittance similarly to the cholesteric liquid crystal layer and can reflect, at a wavelength with high luminosity, projection light obliquely incident on the polarizing plate during the operation of a HUD.

The polarizing plate formed of a laminate of thin films having different refractive index anisotropies may be, for example, a polarizing plate described in JP1997-506837A (JP-H9-506837A). Specifically, when processing is performed under conditions selected to achieve refractive index relations, the polarizing plate can be formed using various materials. In general, one of first materials needs to have, in a selected direction, a refractive index different from that of a second material. This difference in refractive index can be achieved by various methods including stretching during or after film formation, extrusion molding, and coating. In addition, the two materials preferably have similar rheological properties (e.g., melt viscosity) so that they can be coextruded.

The polarizing plate formed of a laminate of thin films having different refractive index anisotropies may be a commercially available polarizing plate. The commercially available polarizing plate may be a laminate of a reflective polarizing plate and a temporary support. Examples of commercially available polarizing plates include commercially available optical films marketed as DBEF (manufactured by 3M) and APF (Advanced Polarizing Film (manufactured by 3M)).

The thickness of the linearly polarized light reflection layer is preferably 1.0 to 50 gum, more preferably 2.0 to 30 µm.

In the present invention, the half-width of reflected light from (the half-width of a reflection spectrum of) the selective reflection layer 46 such as a cholesteric liquid crystal layer is not limited, but is preferably narrow to some extent.

The half-width (full width at half maximum) of reflected light of light incident on the selective reflection layer 46 at an incidence angle of 45° is preferably 70 nm or less, more preferably 50 nm or less, still more preferably 30 nm or less.

When the half-width of reflected light from the selective reflection layer 46 is 70 nm or less, the selective reflection layer 46 (the reflection member 16) also transmits, among sunlight that has entered as described above, visible light in a wavelength range not in the vicinity of the wavelength range of a light beam serving as projection light. This can more suitably prevent thermal damage to, for example, the intermediate image screen 14, the light deflector 36, and the polarizing plate 34 due to visible light.

The half-width of reflected light from the selective reflection layer 46 may be measured by a known method in which wavelengths on the long-wavelength side and the short-wavelength side at which the reflected brightness of reflected light of light incident at an incidence angle of 45° is 50% of a maximum reflected brightness (maximum value) are determined using a spectrophotometer or the like, and the wavelength on the short-wavelength side is subtracted from the wavelength on the long-wavelength side.

Polarization Conversion Layer

The reflection member 16 has the polarization conversion layer 48 as illustrated in FIG. 2.

In the illustrated example, the polarization conversion layer 48 is disposed between the interference suppression layer 50 and the selective reflection layer 46 as a preferred embodiment, but the present invention is not limited to this configuration. For example, the polarization conversion layer 48 may be disposed on a surface of the interference suppression layer 50.

As described above, the reflection member 16 is disposed such that the interference suppression layer 50 is closer to the side on which projection light is incident than the selective reflection layer 46 is. The screen image forming unit 12 projects p-polarized projection light. In addition, the cholesteric liquid crystal layer constituting the selective reflection layer 46 selectively reflects right-handed or left-handed circularly polarized light.

Correspondingly, the polarization conversion layer 48 converts linearly polarized light into circularly polarized light. Specifically, the polarization conversion layer 48 converts p-polarized light transmitted through the interference suppression layer 50 into circularly polarized light having a rotational direction reflected by the cholesteric liquid crystal layer and transmits the circularly polarized light, and converts circularly polarized light reflected by the cholesteric liquid crystal layer into p-polarized light again. The p-polarized light enters the interference suppression layer 50 and passes therethrough. The circularly polarized light in this case includes not only perfectly circularly polarized light but also elliptically polarized light.

Therefore, the polarization conversion layer 48 is disposed closer to the side on which projection light from the screen image forming unit 12 is incident than the selective reflection layer 46 is.

The polarization conversion layer 48 is preferably a λ/4 phase difference layer, whose phase difference in the plane direction is λ/4. Therefore, the retardation Re in the plane direction of the polarization conversion layer 48, for example, at a wavelength of 550 nm is preferably 100 to 450 nm, more preferably 120 to 200 nm or 300 to 400 nm.

Alternatively, the polarization conversion layer 48 may be a 3λ/4 phase difference layer.

In this case, the phase difference layer is disposed with the position of the slow axis set, according to the rotational direction of circularly polarized light that the cholesteric liquid crystal layer reflects, such that p-polarized light is converted into circularly polarized light having a rotational direction reflected by the cholesteric liquid crystal layer.

The polarization conversion layer 48 is not limited, and various known polarization conversion layers can be used as long as they can convert linearly polarized light into circularly polarized light.

Examples of the polarization conversion layer 48 include stretched polycarbonate films, stretched norbornene polymer films, transparent films in which inorganic particles having birefringence, such as strontium carbonate, are aligned, thin films obtained by oblique vapor deposition of an inorganic dielectric on a support, films obtained by uniaxially aligning a polymerizable liquid crystal compound and fixing the alignment, and films obtained by uniaxially aligning a liquid crystal compound and fixing the alignment.

Among them, films obtained by uniaxially aligning a polymerizable liquid crystal compound and fixing the alignment are suitable as the polarization conversion layer 48.

This polarization conversion layer 48 can be formed, for example, by applying a liquid crystal composition including a polymerizable liquid crystal compound onto a surface of a temporary support or an alignment film, subjecting the polymerizable liquid crystal compound in a liquid crystalline state in the liquid crystal composition to nematic alignment, and then fixing the alignment by performing curing.

The formation of the polarization conversion layer 48 in this case can be performed in the same manner as the formation of the cholesteric liquid crystal layer described above, except that no chiral agents are added to the liquid crystal composition. In the nematic alignment after the application of the liquid crystal composition, the heating temperature is preferably 50° C. to 120° C., more preferably 60° C. to 100° C.

The polarization conversion layer 48 may be a layer obtained by applying a composition including a high-molecular-weight liquid crystal compound onto a surface of a temporary support, an alignment film, or the like, forming nematic alignment in a liquid crystalline state, and then fixing the alignment by performing cooling.

The polarization conversion layer 48 may also be an optical rotation layer (twist layer) that is formed by fixing a liquid crystal compound twistedly aligned at a twist angle of less than 360° along a helical axis extending in the thickness direction and that causes the polarization direction of linearly polarized light to rotate. That is, the polarization conversion layer 48 may be an optical rotation layer (optical rotation film) that twistedly aligns a liquid crystal compound.

The thickness of the polarization conversion layer 48 is not limited, and is preferably 0.2 to 300 μm, more preferably 0.5 to 150 μm, still more preferably 1.0 to 80 μm. The thickness of the polarization conversion layer 48 formed of the liquid crystal composition is not particularly limited, and is preferably 0.2 to 10 μm, more preferably 0.5 to 5.0 μm, still more preferably 0.7 to 2.0 μm.

Interference Suppression Layer

The reflection member 16 has the interference suppression layer 50 having a thickness of 10 μm or more on the polarization conversion layer 48.

In the projector 10 of the present invention, due to the configuration in which the reflection member 16 that acts as a cold mirror has the interference suppression layer 50 that is located closer to the side on which projection light from the screen image forming unit 12 is incident than the selective reflection layer 46 is, the occurrence of a decrease in brightness of a projection image and a loss of color balance of a projection image is prevented even when the wavelength of a light beam emitted from the light source 30 has varied.

As described in WO2016/003090A, by using a cholesteric liquid crystal layer having a reflection wavelength range in the visible range as a reflection member that acts as a cold mirror in a projector, not only infrared light but also visible light outside the reflection wavelength range of the cholesteric liquid crystal layer can be transmitted through the reflection member.

Thus, when a reflection member having a cholesteric liquid crystal layer is used, deterioration of an intermediate image screen, a polarizing plate, etc. due to heating by sunlight entering into a projector and traveling counter to projection light can be prevented more effectively than when an ordinary cold mirror is used.

However, when a reflection member having a cholesteric liquid crystal layer is used in a HUD projector, the reflectivity (reflection intensity) may decrease when the wavelength of a light beam has varied in response to, for example, heat generated from a light source. As a result, a decrease in brightness of a projection image, a loss of color balance of a projection image, and the like occur in the HUD. In particular, in the case of a HUD projector in which a light beam is used as a light source, the reflection intensity of the reflection member greatly decreases due to variation of the wavelength of the light beam.

The present inventors investigated the cause of this and found that since cholesteric liquid crystal layers are thin, light reflected by a cholesteric liquid crystal layer interferes inside a cholesteric liquid crystal layer on the upper side (light incident and outgoing side), and the reflection wavelength characteristics of the cholesteric liquid crystal layers greatly vary at or near a maximum reflection wavelength, thus resulting in the decrease in reflection intensity.

As described above, the reflection member 16 illustrated in the figure has three cholesteric liquid crystal layers: the red-reflecting cholesteric liquid crystal layer 46R, the green-reflecting cholesteric liquid crystal layer 46G, and the blue-reflecting cholesteric liquid crystal layer 46B, which are disposed in this order from the substrate 40 side.

A light beam emitted from the light source 30, that is, projection light, is incident on the blue-reflecting cholesteric liquid crystal layer 46B side.

Figure 3:
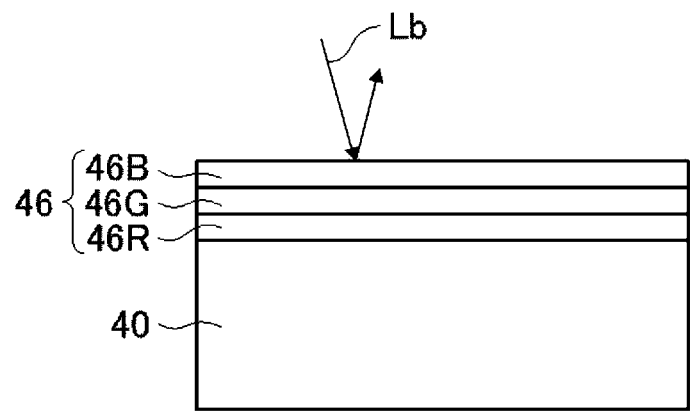
FIG. 3 is a schematic diagram for explaining the action of a reflection member of the related art.

As schematically illustrated in FIG. 3, a blue light beam Lb is normally reflected by the blue-reflecting cholesteric liquid crystal layer 46B on the incidence plane side.

Figure 4:
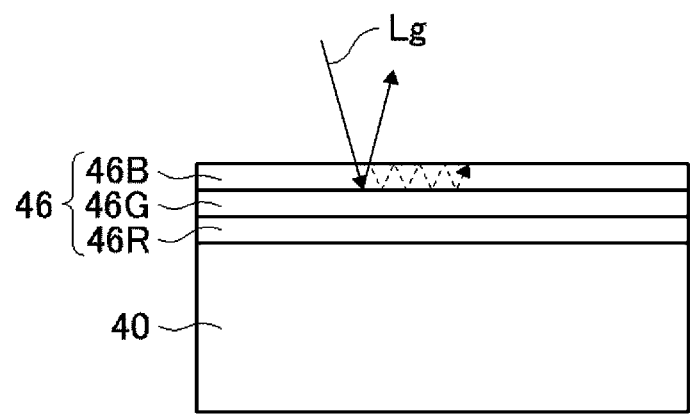
FIG. 4 is a schematic diagram for explaining the action of the reflection member of the related.

Meanwhile, as schematically illustrated in FIG. 4, a green light beam Lg is transmitted through the blue-reflecting cholesteric liquid crystal layer 46B and reflected by the green-reflecting cholesteric liquid crystal layer 46G. The reflected light beam Lg attempts to pass through the blue-reflecting cholesteric liquid crystal layer 46B. However, since the blue-reflecting cholesteric liquid crystal layer 46B is thin, part of the light beam Lg, as indicated by the broken line in FIG. 4, interferes inside the blue-reflecting cholesteric liquid crystal layer 46B due to a difference in refractive index between the blue-reflecting cholesteric liquid crystal layer 46B and the air interface.

Figure 5:
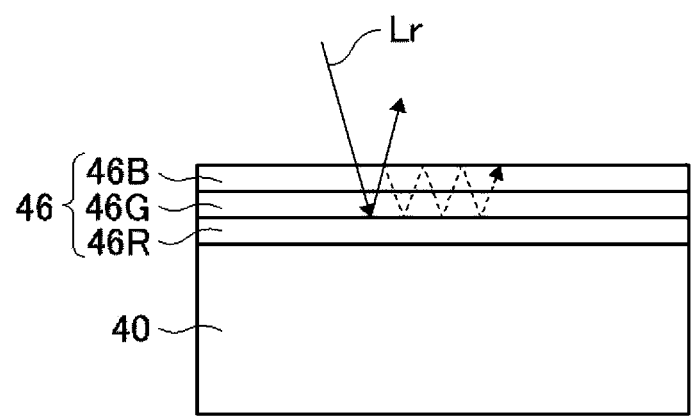
FIG. 5 is a schematic diagram for explaining the action of the reflection member of the related art.

Furthermore, as schematically illustrated in FIG. 5, a red light beam Lr is transmitted through the blue-reflecting cholesteric liquid crystal layer 46B and the green-reflecting cholesteric liquid crystal layer 46G and reflected by the red-reflecting cholesteric liquid crystal layer 46R. The reflected light beam Lr attempts to pass through the green-reflecting cholesteric liquid crystal layer 46G and the blue-reflecting cholesteric liquid crystal layer 46B. However, since the green-reflecting cholesteric liquid crystal layer 46G and the blue-reflecting cholesteric liquid crystal layer 46B are thin, part of the light beam Lr, as indicated by the broken line in FIG. 5, similarly interferes inside the green-reflecting cholesteric liquid crystal layer 46G and the blue-reflecting cholesteric liquid crystal layer 46B due to a difference in refractive index between the blue-reflecting cholesteric liquid crystal layer 46B and the air interface.

When the polarization conversion layer 48 is disposed on the blue-reflecting cholesteric liquid crystal layer 46B, such interference occurs also in the polarization conversion layer 48.

Due to the occurrence of such interference, in a cholesteric liquid crystal layer having another cholesteric liquid crystal layer on the light beam incident side, the reflectivity varies and decreases at or near the selective reflection center wavelength upon variation of the wavelength of a light beam (projection light). In the case of the illustrated example, in the red-reflecting cholesteric liquid crystal layer 46R and the green-reflecting cholesteric liquid crystal layer 46G, the reflectivity varies and decreases at or near the selective reflection center wavelength upon variation of the wavelengths of the light beam Lr and the light beam Lb.

That is, in a cholesteric liquid crystal layer having another cholesteric liquid crystal layer on the light beam incident side, the wavelength dependence of the reflectivity at or near the selective reflection center wavelength is high. The wavelength dependence of the reflectivity increases as the half-width of the light beam decreases. In particular, in the case of a light beam having a half-width of 20 nm or less, the reflectivity greatly varies with variation in wavelength.

As a result, when the wavelengths of the green light beam Lg and the red light beam Lr (projection light) vary due to heat generated from the G light source 30G and the R light source 30R, the reflectivities of the red-reflecting cholesteric liquid crystal layer 46R and the green-reflecting cholesteric liquid crystal layer 46G decrease, thus resulting in a decrease in brightness and a loss of color balance of a projection image.

By contrast, in the projector 10 of present invention, the reflection member 16 has the interference suppression layer 50 with a thickness of 10 μm or more that is located closer to the side on which projection light, that is, a light beam is incident than the selective reflection layer 46 is.

Figure 6:
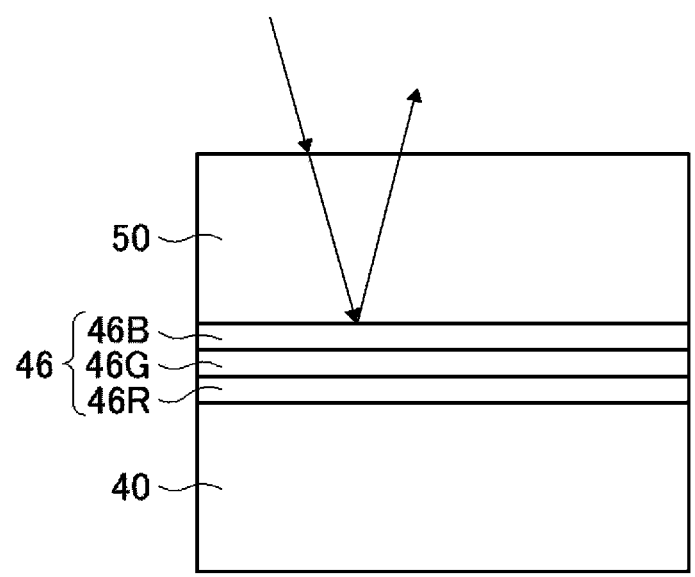
FIG. 6 is a schematic diagram for explaining the action of the reflection member of the present invention.

The refractive index of the interference suppression layer 50 (the refractive index of resin) is close to those of the cholesteric liquid crystal layers. Thus, as schematically illustrated in FIG. 6, the blue light beam Lb is reflected by the blue-reflecting cholesteric liquid crystal layer 46B on the incidence plane side and transmitted through the interference suppression layer 50 to exit.

Figure 7:
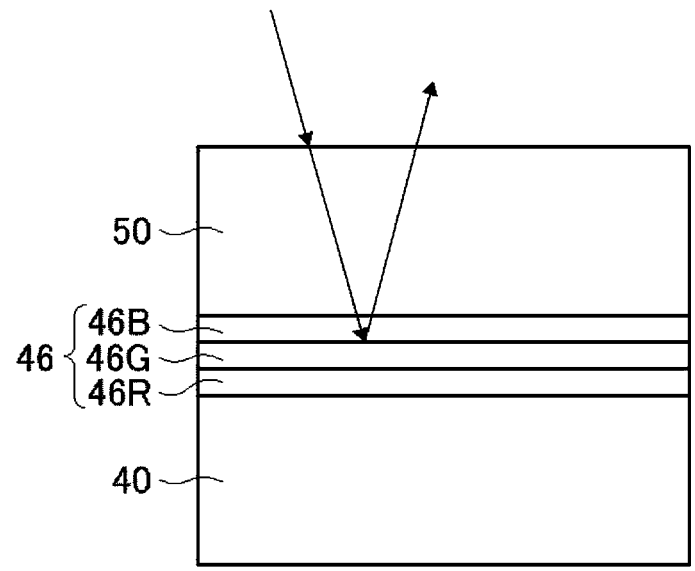
FIG. 7 is a schematic diagram for explaining the action of the reflection member of the present invention.

Furthermore, as schematically illustrated in FIG. 7, the green light beam Lg is transmitted through the interference suppression layer 50 and the blue-reflecting cholesteric liquid crystal layer 46B and reflected by the green-reflecting cholesteric liquid crystal layer 46G.

The reflected light beam Lg enters the blue-reflecting cholesteric liquid crystal layer 46B. Due to the presence of the interference suppression layer 50 having a similar refractive index on the blue-reflecting cholesteric liquid crystal layer 46B, the light beam Lg is transmitted through the blue-reflecting cholesteric liquid crystal layer 46B and enters the interference suppression layer 50. In addition, since the interference suppression layer 50 has a sufficient thickness, interference inside the interference suppression layer 50 does not occur even if the difference in refractive index between the interference suppression layer 50 and the air interface is large, and the light beam Lg is transmitted through the interference suppression layer 50 to exit, as illustrated in FIG. 7.

Figure 8:
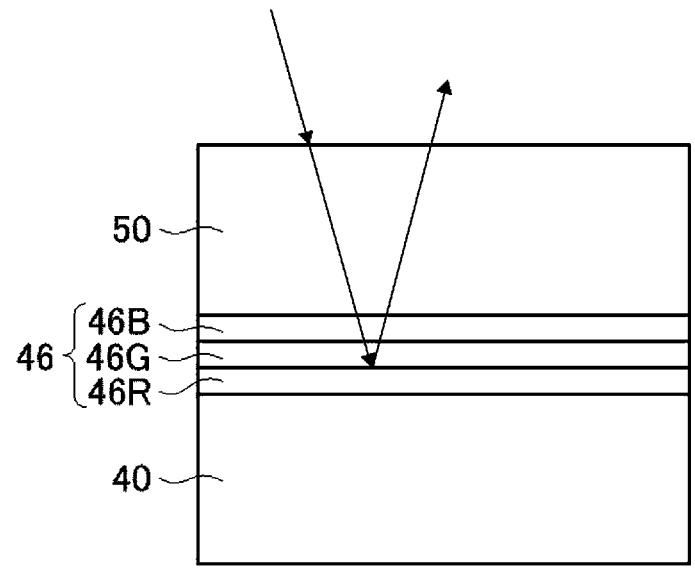
FIG. 8 is a schematic diagram for explaining the action of the reflection member of the present invention.

Furthermore, as schematically illustrated in FIG. 8, the red light beam Lr is transmitted through the interference suppression layer 50, the blue-reflecting cholesteric liquid crystal layer 46B, and the green-reflecting cholesteric liquid crystal layer 46G and reflected by the red-reflecting cholesteric liquid crystal layer 46R.

The reflected light beam Lr is transmitted through the green-reflecting cholesteric liquid crystal layer 46G and enters the blue-reflecting cholesteric liquid crystal layer 46B. Due to the presence of the interference suppression layer 50 having a similar refractive index on the blue-reflecting cholesteric liquid crystal layer 46B, the light beam Lr is transmitted through the blue-reflecting cholesteric liquid crystal layer 46B and enters the interference suppression layer 50. In addition, since the interference suppression layer 50 has a sufficient thickness, interference inside the interference suppression layer 50 does not occur even if the difference in refractive index between the interference suppression layer 50 and the air interface is large, and the light beam Lr is transmitted through the interference suppression layer 50 to exit, as illustrated in FIG. 8.

Thus, in the reflection member 16 having the interference suppression layer 50 on the side on which projection light is incident with respect to the selective reflection layer 46, the reflectivity will not vary if the wavelength has varied in the case of a light beam (projection light) having a half-width as small as 20 nm or less. That is, in the reflection member 16, the wavelength dependence of the reflectivity at or near the selective reflection center wavelength of each color is low.

Thus, according to the projector 10 of the present invention in which the reflection member 16 having the interference suppression layer 50 on the side on which projection light is incident with respect to the selective reflection layer 46 is used, the reflectivity will not vary if the wavelengths of the green light beam Lg and the red light beam Lr have varied due to heat generated from the G light source 30G and the R light source 30R, and a projection image having high brightness and a good color balance can be stably projected.

Although the adhesive layer 42 and the polarization conversion layer 48 are omitted in FIG. 3 to FIG. 8 to simplify the figures, the same phenomenon occurs.

Also when a linearly polarized light reflection layer is used instead of the selective reflection layer 46 that selectively reflects circularly polarized light, the same phenomenon occurs.

The thickness of the interference suppression layer 50 is 10 μM or more.

When the thickness of the interference suppression layer 50 is less than 10 μm, interference of light cannot be sufficiently suppressed, and variation of the wavelength of a light beam (projection light) may cause, for example, a decrease in brightness and a loss of color balance.

Here, the interference suppression layer 50 for preventing the occurrence of interference in the cholesteric liquid crystal layers needs to be thicker as the half-width of the light beam becomes narrower. In addition, the thickness of the interference suppression layer 50 for preventing the occurrence of interference in the cholesteric liquid crystal layers needs to be thicker as the wavelength of the light beam becomes longer. That is, the narrower the half-width of the light beam is, and the longer the wavelength of the light beam is, the more likely it is that interference in the cholesteric liquid crystal layers occurs, and the more likely it is that a decrease in reflectivity due to wavelength variation occurs.

For example, in the case of a light beam having a half-width of 10 nm, the thickness of the interference suppression layer 50 is preferably 20 µm or more in order to prevent the interference of a light beam of 450 nm. In the case of a light beam having a half-width of 10 nm, the thickness of the interference suppression layer 50 is preferably 28 µm or more in order to prevent the interference of a light beam of 532 nm. Furthermore, in the case of a light beam having a half-width of 10 nm, the thickness of the interference suppression layer 50 is preferably 40 µm or more in order to prevent the interference of a light beam of 633 nm.

In view of this, the thickness of the interference suppression layer 50 is preferably 40 µm or more, more preferably 80 µm or more, still more preferably 100 µm or more, particularly preferably 400 µm or more.

The upper limit of the thickness of the interference suppression layer 50 is not limited.

The thickness of the interference suppression layer 50 is preferably 2.0 mm or less, more preferably 1.0 mm or less, because, for example, the reflection member 16 can be prevented from becoming unnecessarily thick, and the reflection member 16 can be prevented from being likely to transfer when having a curvature.

The interference suppression layer 50 preferably has a high visible light transmittance.

The visible light transmittance of the interference suppression layer 50 is preferably 80% or more, more preferably 85% or more, still more preferably 90% or more.

The interference suppression layer 50 having a visible light transmittance of 80% or more is preferred in that, for example, a high-brightness projection image can be projected, and a high-brightness projection image that suffers little loss when reflected can be projected.

The in-plane retardation Re of the interference suppression layer 50 is not limited, but is preferably small.

The in-plane retardation Re of the interference suppression layer 50 is preferably 10 nm or less, more preferably 5 nm or less, still more preferably 2 nm or less.

The interference suppression layer 50 having an in-plane retardation Re of 10 nm or less is preferred in that, for example, loss of polarization of projection light due to the interference suppression layer 50 can be prevented, and less interference occurs when linearly polarized light is incident.

The refractive index of the interference suppression layer 50 is also not limited, but the difference in refractive index between the interference suppression layer 50 and the cholesteric liquid crystal layers (selective reflection layer) is preferably small.

The refractive index of the interference suppression layer 50 is preferably 1.45 to 1.6, more preferably 1.5 to 1.58, still more preferably 1.52 to 1.56.

Although the refractive index of the interference suppression layer 50 is also not limited, the interference suppression layer 50 having a refractive index of 1.45 to 1.6 is preferred in that, for example, the difference in refractive index between the interference suppression layer 50 and the cholesteric liquid crystal layers (selective reflection layer) can be sufficiently small, thus preventing reflection of light at the interface between the interference suppression layer 50 and the cholesteric liquid crystal layers.

The material for forming the interference suppression layer 50 is not limited, and various resin materials that provide a sufficient visible light transmittance can be used. Examples include resin materials such as TAC, COP, PMMA, polycarbonate (PC), and PET, glass, and acrylic plates.

Among them, for example, TAC, COP, and PMMA are suitable for use.

Alignment Film

The reflection member may include an alignment film as an underlayer to which the liquid crystal composition is applied when the cholesteric liquid crystal layer or the phase difference layer is formed.

The alignment film can be provided by means of, for example, rubbing treatment of an organic compound such as a polymer (e.g., a resin such as polyimide, polyvinyl alcohol, polyester, polyarylate, polyamide-imide, polyetherimide, polyamide, or modified polyamide), oblique deposition of an inorganic compound, formation of a layer having microgrooves, or accumulation of an organic compound (e.g., co-tricosanoic acid, dioctadecylmethylammonium chloride, or methyl stearate) using the Langmuir-Blodgett technique (LB film). Furthermore, an alignment film whose alignment function is activated by application of an electric field, application of a magnetic field, or irradiation with light may be used.

In particular, preferably, an alignment layer formed of a polymer is subjected to rubbing treatment and then the liquid crystal composition is applied onto the surface subjected to the rubbing treatment. The rubbing treatment can be performed by rubbing a surface of a polymer layer with paper or cloth in a certain direction.

The liquid crystal composition may be applied onto a surface of the interference suppression layer 50 subjected to the rubbing treatment without providing an alignment film. That is, the interference suppression layer 50 may serve as an alignment film.

The thickness of the alignment film is not limited, and is preferably 0.01 to 5.0 µm, more preferably 0.05 to 2.0 µm.

When the reflection member having the selective reflection layer and the like is produced using a temporary support, the alignment layer may be peeled off together with the temporary support. That is, the alignment film may be present only during the production of the reflection member and need not be a layer constituting the reflection member when the reflection member has been completed.

The reflection member 16 having such a configuration can be produced by various methods.

For example, a film to serve as the alignment film is formed on a surface of a resin film or the like to serve as the interference suppression layer 50, and the alignment film is formed by, for example, rubbing treatment. Subsequently, the polarization conversion layer 48 is formed on the alignment film, and the selective reflection layer 46 such as a cholesteric liquid crystal layer is formed on the surface of the polarization conversion layer. The laminate having the interference suppression layer 50 (alignment film), the polarization conversion layer 48, and the selective reflection layer is bonded to the substrate 40 such as a glass plate by using the adhesive layer 42 such as an OCA with the selective reflection layer 46 facing the substrate 40, thereby completing the reflection member 16.

Alternatively, after an alignment film and the polarization conversion layer 48 are formed on a temporary support, the temporary support is peeled off, and the substrate 40 and the interference suppression layer 50 may be formed using an adhesive layer such as an OCA.

Hard Coat Layer

The reflection member 16 may optionally have a hard coat layer on the interference suppression layer 50 (the side opposite the selective reflection layer 46) to improve scratch resistance.

Hard Coat Layer-Forming Composition

The hard coat layer is preferably formed using a hard coat layer-forming composition.

The hard coat layer-forming composition preferably includes a compound having three or more ethylenically unsaturated double bond groups in its molecule.

Examples of ethylenically unsaturated double bond groups include polymerizable functional groups such as a (meth)acryloyl group, a vinyl group, a styryl group, and an allyl group. Among them, a (meth)acryloyl group and —C(O)OCH=CH$_2$ are preferred, and a (meth)acryloyl group is more preferred. When an ethylenically unsaturated double bond group is contained, high hardness can be maintained, and moist-heat resistance can be provided. Furthermore, when three or more ethylenically unsaturated double bond groups are contained in the molecule, higher hardness can be exhibited.

Examples of the compound having three or more ethylenically unsaturated double bond groups in its molecule include esters of polyhydric alcohols and (meth)acrylic acids, vinyl benzene and derivatives thereof, vinyl sulfone, and (meth)acrylamide. In particular, compounds having three or more (meth)acryloyl groups are preferred from the viewpoint of hardness, and examples include acrylate compounds that form cured products with high hardness and are widely used in this industrial field. Examples of such compounds include esters of polyhydric alcohols and (meth) acrylic acids. Examples of esters of polyhydric alcohols and (meth)acrylic acids include pentaerythritol tetra(meth)acrylate, pentaerythritol tri(meth)acrylate, trimethylolpropane tri(meth)acrylate, EO-modified trimethylolpropane tri (meth)acrylate, PO-modified trimethylolpropane tri(meth) acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate, and caprolactone-modified tris(acryloxyethyl) isocyanurate.

Specific examples of polyfunctional acrylate compounds having three or more (meth)acryloyl groups include esters of polyols and (meth)acrylic acids, such as KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60, and KAYARAD GPO-303 manufactured by Nippon Kayaku Co., Ltd. and V#400 and V#36095D manufactured by Osaka Organic Chemical Industry Ltd.

For example, tri- or higher functional urethane acrylate compounds such as SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA, and SHIKOH UV-2750B (manufactured by Nippon Synthetic Chemical Industry Co., Ltd.), UL-503LN (manufactured by Kyoeisha Chemical Co., Ltd.), UNIDIC 17-806, UNIDIC 17-813, UNIDIC V-4030, and UNIDIC V-4000BA (manufactured by DIC Corporation), EB-1290K, EB-220, EB-5129, EB-1830, and EB-4358 (manufactured by Daicel UCB Co., Ltd.), HIGH-COAP AU-2010 and HIGH-COAP AU-2020 (manufactured by Tokushiki Co., Ltd.), ARONIX M-1960 (manufactured by Toagosei Co., Ltd.), and Art Resin UN-3320HA, UN-3320HC, UN-3320HS, UN-904, and HDP-4T; and tri- or higher functional polyester compounds such as ARONIX M-8100, M-8030, and M-9050 (manufactured by Toagosei Co., Ltd.) and KBM-8307 (manufactured by Daicel-Cytec Co., Ltd.) are also suitable for use.

The compound having three or more ethylenically unsaturated double bond groups in its molecule may be composed of a single compound or a plurality of compounds combined together.

Method of Forming Hard Coat Layer

The hard coat layer can be formed by applying the hard coat layer-forming composition described above to the surface of the interference suppression layer 50 and performing drying and curing.

Coating Method for Hard Coat Layer

The hard coat layer can be formed by the following coating methods, but these methods are non-limiting examples. As coating methods, known methods such as dip coating, air knife coating, curtain coating, roller coating, wire bar coating, gravure coating, slide coating, extrusion coating (die coating) (see JP2003-164788A), and microgravure coating are used. Among them, microgravure coating and die coating are preferred.

Conditions for Drying and Curing Hard Coat Layer

Preferred examples of drying and curing methods in the case where a layer such as a hard coat layer is formed by coating in the present invention will be described below.

In the present invention, performing curing by combination of irradiation with ionizing radiation and heat treatment before, simultaneous with, or after the irradiation is effective.

Several non-limiting examples of production process patterns are shown below. In the following examples, "-" means that heat treatment is not performed.

Before irradiation→simultaneous with irradiation→after irradiation (1) Heat treatment ionizing radiation curing→-

(2) Heat treatment→ionizing radiation curing→heat treatment (3) -→ionizing radiation curing→heat treatment In addition, a process in which heat treatment is performed simultaneously with ionizing radiation curing is also preferred.

In the present invention, when a hard coat layer is formed, it is preferable to perform heat treatment in combination with irradiation with ionizing radiation, as described above. The heat treatment is not particularly limited as long as constituent layers including the hard coat layer and a support for the hard coat film are not damaged, but is preferably performed at 25° C. to 150° C., more preferably at 30° C. to 80° C.

The time required for the heat treatment, although depending on, for example, the molecular weight, interaction with other components, and viscosity of components used, is 15 seconds to 1 hour, preferably 20 seconds to 30 minutes, more preferably 30 seconds to 5 minutes.

Examples of the type of ionizing radiation include, but are not limited to, X-rays, electron beams, ultraviolet light, visible light, and infrared light, and ultraviolet light is widely used.

For example, in the case of an ultraviolet curable coating, it is preferable to cure layers by irradiation with ultraviolet light at a dose of 10 to 1000 mJ/cm$^2$ using an ultraviolet lamp. In the irradiation, ultraviolet light with this energy may be applied in one portion or divided portions. In particular, to reduce performance variation in the plane of the coating and further improve curling, ultraviolet light is preferably applied in two or more divided portions. Specifically, it is preferable to apply ultraviolet light at a low dose of 150 mJ/cm$^2$ or less at an initial stage and then apply ultraviolet light at a high dose of 50 mJ/cm$^2$ or more, the dose at the latter stage being higher than the dose at the initial stage.

As described above, projection light from the projector 10 is transmitted through the transmission window 24 and projected onto the windshield glass 26, and a projection image is observed by the user O.

As described above, in the projector 10 of the present invention, the reflection member 16 that acts as a cold mirror has the interference suppression layer 50, and thus the wavelength dependence of the reflectivity of the reflection member 16 is low. Thus, according to the present invention, the reflectivity of the reflection member 16 does not vary if the wavelength of a light beam has varied due to heat generation, and a projection image having high brightness and a good color balance can be stably projected.

The windshield glass 26 is meant to include window glass and windscreen glass of common vehicles such as cars, trains, airplanes, ships, two-wheeled vehicles, and rides.

The windshield glass 26, for example, has a structure in which a half-mirror film 60 is sandwiched between intermediate films 62 and this laminate is sandwiched between two glass plates 64.

The glass plates 64 are known glass plates used for windshield glass and may be flat, curved, or may have both flat and curved portions. For the intermediate films 62, known materials used for an intermediate film in laminated glass for windshield, such as polyvinyl butyral and ethylene-vinyl acetate copolymers, can be used.

In a preferred embodiment, the projector 10 projects p-polarized projection light onto the windshield glass 26. Therefore, the half-mirror film 60 of the windshield glass 26 preferably reflects p-polarized light.

The half-mirror film 60 that reflects p-polarized light has, for example, three cholesteric liquid crystal layers, that is, a cholesteric liquid crystal layer that selectively reflects red light, a cholesteric liquid crystal layer that selectively reflects green light, and a cholesteric liquid crystal layer that selectively reflects blue light, which are the same as the cholesteric liquid crystal layers described above, and a λ/4 phase difference layer, the λ/4 phase difference layer being disposed on the projection light incident side.

The cholesteric liquid crystal layers all reflect circularly polarized light having the same rotational direction.

The direction of the slow axis of the λ/4 phase difference layer is set so as to convert incident p-polarized light into circularly polarized light having a rotational direction reflected by the cholesteric liquid crystal layers according to the circularly polarized light that the cholesteric liquid crystal layers reflect.

According to the half-mirror film 60 having such a configuration, the λ/4 phase difference layer converts incident p-polarized projection light into circularly polarized light, which is incident on the cholesteric liquid crystal layers; the cholesteric liquid crystal layers reflect the circularly polarized projection light, which is incident on the λ/4 phase difference layer again; and the λ/4 phase difference layer converts the circularly polarized projection light into p-polarized projection light.

In this manner, the half-mirror film 60 reflects p-polarized projection light.

The projector of the present invention need not necessarily project p-polarized projection light and may project an s-polarized projection image. When the projector projects s-polarized projection light, it is not necessary to incorporate the half-mirror film 60 into the windshield glass because the projection light is reflected by the surface of the glass plate.

However, the projector of the present invention preferably projects p-polarized projection light because, for example, a projection image can be observed using polarizing sunglasses, and the windshield glass need not be wedge-shaped.

While the HUD projector of the present invention has been described above in detail, it should be appreciated that the present invention is not limited to the foregoing examples, and various modifications and changes may be made without departing from the spirit of the invention.

EXAMPLES

The present invention will now be described more specifically with reference to Examples of the present invention. Materials, reagents, amounts and percentages of substances, operations, and the like used in Examples, Comparative Examples, and Production Examples below can be appropriately changed without departing from the spirit of the present invention. Therefore, the scope of the present invention is not limited to Examples and Reference Examples below.

Preparation of Composition

Narrow-Band Cholesteric Liquid Crystal Layer-Forming Compositions 1, 2, and 3

By mixing the following components, a narrow-band cholesteric liquid crystal layer-forming composition 1 for forming a narrow-band cholesteric liquid crystal layer having a selective reflection center wavelength of 450 nm at an incidence angle of 45°, a narrow-band cholesteric liquid crystal layer-forming composition 2 for forming a narrow-band cholesteric liquid crystal layer having a selective reflection center wavelength of 530 nm at an incidence angle of 45°, and a narrow-band cholesteric liquid crystal layer-forming composition 3 for forming a narrow-band cholesteric liquid crystal layer having a selective reflection center wavelength of 630 nm at an incidence angle of 45° were prepared.

| Narrow-band cholesteric liquid crystal layer-forming compositions 1, 2, and 3 | |
|---|---|
| Rod-like liquid crystal compound 101 | 55 parts by mass |
| Rod-like liquid crystal compound 102 | 30 parts by mass |
| Rod-like liquid crystal compound 201 | 13 parts by mass |
| Rod-like liquid crystal compound 202 | 2 parts by mass |
| Polymerization initiator IRGACURE OXE01 (manufactured by BASF) | 1.0 part by mass |
| Alignment controlling agent 1 (fluorine-based horizontal alignment agent 1) | 0.01 parts by mass |
| Alignment controlling agent 2 (fluorine-based horizontal alignment agent 2) | 0.01 parts by mass |
| Dextrorotatory chiral agent LC756 (manufactured by BASF) | adjusted according to a target selective reflection center wavelength |
| Solvent (methyl ethyl ketone) | an amount to give a solute concentration of 20 mass % |

Rod-Like Liquid Crystal Compound 101
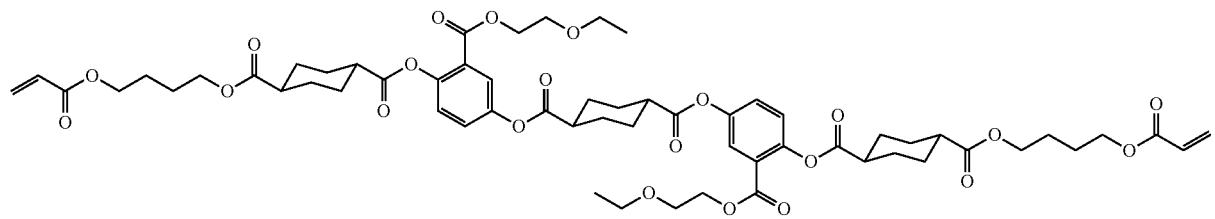 [SMILES: C=CC(=O)OCCCCOC(=O)C1CCC(C(=O)Oc2ccc(OC(=O)C3CCC(C(=O)Oc4ccc(OC(=O)C5CCC(C(=O)OCCCCOC(=O)C=C)CC5)c(C(=O)OCCOCC)c4)CC3)cc2C(=O)OCCOCC)CC1]
Rod-Like Liquid Crystal Compound 102
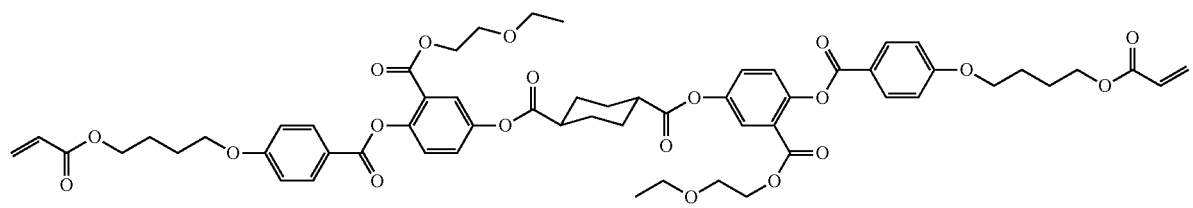 [SMILES: C=CC(=O)OCCCCOc1ccc(C(=O)Oc2ccc(OC(=O)C3CCC(C(=O)Oc4ccc(OC(=O)c5ccc(OCCCCOC(=O)C=C)cc5)c(C(=O)OCCOCC)c4)CC3)cc2C(=O)OCCOCC)cc1]
Rod-Like Liquid Crystal Compound 201
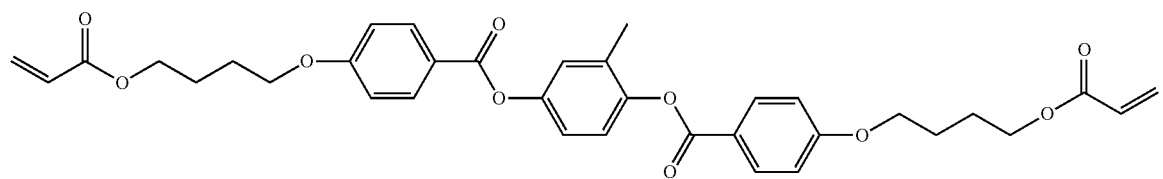 [SMILES: C=CC(=O)OCCCCOc1ccc(C(=O)Oc2ccc(OC(=O)c3ccc(OCCCCOC(=O)C=C)cc3)c(C)c2)cc1]
Rod-Like Liquid Crystal Compound 202
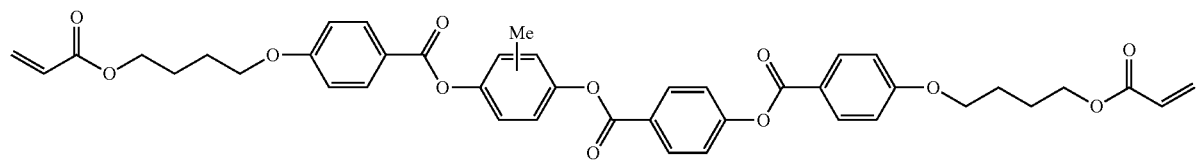
Alignment Controlling Agent 2
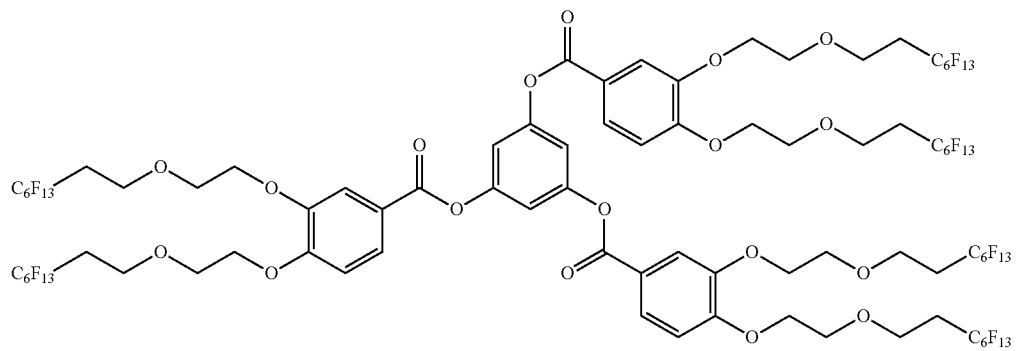

Alignment Controlling Agent 1

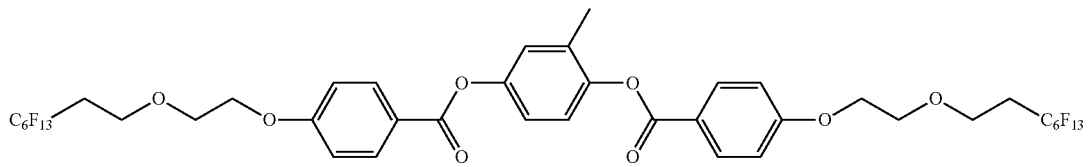

By adjusting the amount of the dextrorotatory chiral agent LC756 in this composition, the narrow-band cholesteric liquid crystal layer-forming compositions 1 to 3 were prepared.

Using each of the narrow-band cholesteric liquid crystal layer-forming compositions 1 to 3, a single narrow-band cholesteric liquid crystal layer having a thickness of 4 μm was formed on a temporary support in the same manner as in the production of a reflection member described below, and the reflection characteristics of light in the visible range were evaluated. The narrow-band cholesteric liquid crystal layers formed were all right-handed circularly polarized light reflection layers. The selective reflection center wavelength at an incidence angle of 45° was as follows: the narrow-band cholesteric liquid crystal layer-forming composition 1, 450 nm; the narrow-band cholesteric liquid crystal layer-forming composition 2, 530 nm; the narrow-band cholesteric liquid crystal layer-forming composition 3, 630 nm.

Phase Difference Layer-Forming Composition

The following components were mixed to prepare a phase difference layer-forming composition having the following composition.

| Phase difference layer-forming composition | |
|---|---|
| Mixture 1 | 100 parts by mass |
| Alignment controlling agent 1 | 0.05 parts by mass |
| Alignment controlling agent 3 (fluorine-based horizontal alignment agent 3) | 0.01 parts by mass |
| Polymerization initiator IRGACURE OXE01 (manufactured by BASF) | 1.0 part by mass |
| Solvent (methyl ethyl ketone) | an amount to give a solute concentration of 30 mass % |

Mixture 1

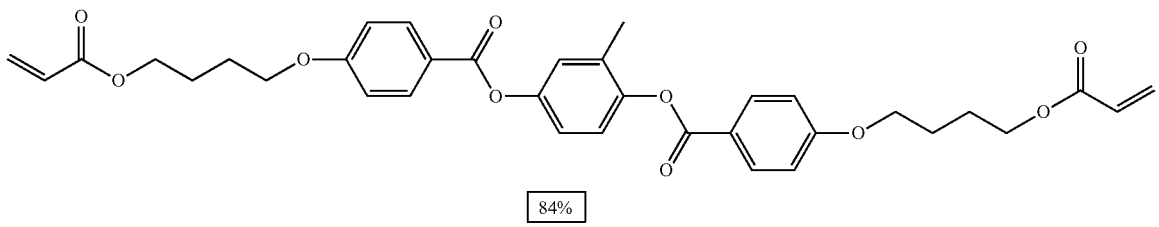

84%

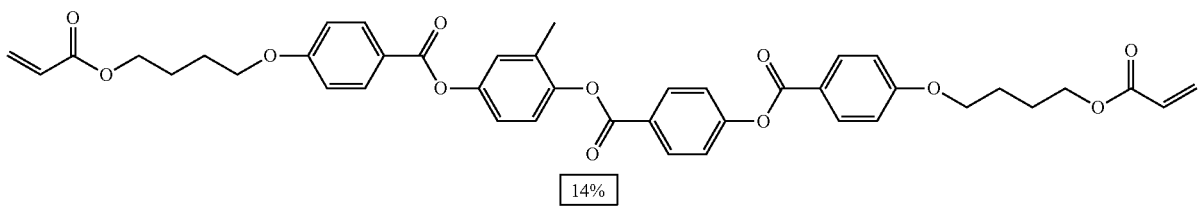

14%

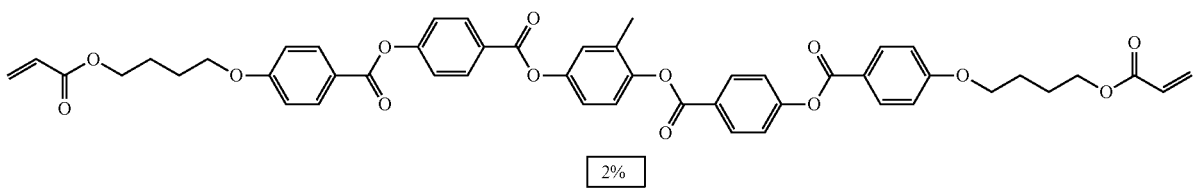

2%

The numerical values are in mass %.
Alignment Controlling Agent 3

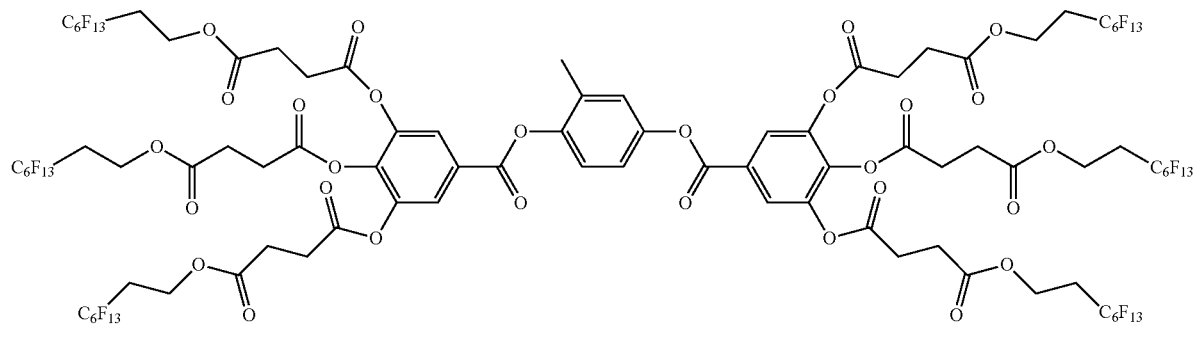

Example 1

Production of Reflection Member
Saponification of Cellulose Acylate Film

A 40 μm cellulose acylate film (TAC film) obtained by the same production method as in Example 20 in WO2014/112575A was passed through dielectric heating rolls at 60° C. to increase the film surface temperature to 40° C., after which an alkali solution having the following composition in an amount of 14 mL/m² was applied to one surface of the film using a bar coater and retained for 10 seconds under a steam-type far infrared heater (manufactured by Noritake Co., Ltd.) heated to 110° C.

Subsequently, pure water in an amount of 3 mL/m² was applied also using a bar coater. Subsequently, washing with water using a fountain coater and dewatering using an air knife were repeated three times, and the film was then dried by being retained in a drying zone at 70° C. for 5 seconds to produce a saponified cellulose acylate film 1.

The refractive index of the cellulose acylate film 1 was measured with a phase difference meter (manufactured by Oji Scientific Instruments, KOBRA-WPR) and found to be 1.49. The in-plane retardation Re of the cellulose acylate film 1 was measured with an AxoScan and found to be 2 nm.

| Alkali solution | |
|---|---|
| Potassium hydroxide | 4.7 parts by mass |
| Water | 15.7 parts by mass |
| Isopropanol | 64.8 parts by mass |
| Surfactant ($C_{16}H_{33}O(CH_2CH_2O)_{10}H$) | 1.0 part by mass |
| Propylene glycol | 14.9 parts by mass |

Formation of Alignment Film

An alignment film-forming composition having the following composition in an amount of 24 mL/m² was applied to the saponified surface of the saponified cellulose acylate film 1 (transparent support) by using a wire bar coater and dried with hot air at 100° C. for 120 seconds.

| Composition of alignment film-forming composition | |
|---|---|
| Modified polyvinyl alcohol | 28 parts by mass |
| Citric acid ester (AS3, manufactured by Sankyo Kagaku Yakuhin Co., Ltd.) | 1.2 parts by mass |
| Photoinitiator (IRGACURE 2959, manufactured by BASF) | 0.84 parts by mass |
| Glutaraldehyde | 2.8 parts by mass |
| Water | 699 parts by mass |
| Methanol | 226 parts by mass |

Modified Polyvinyl Alcohol

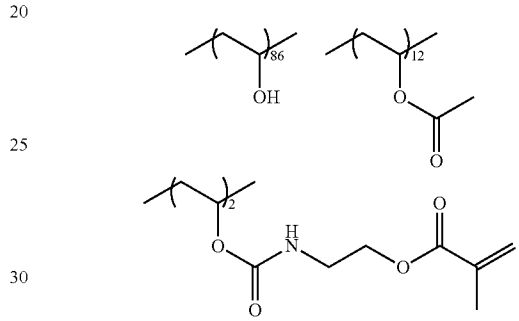

Formation of λ/4 Layer (λ/4 Phase Difference Layer)

Figure 9:
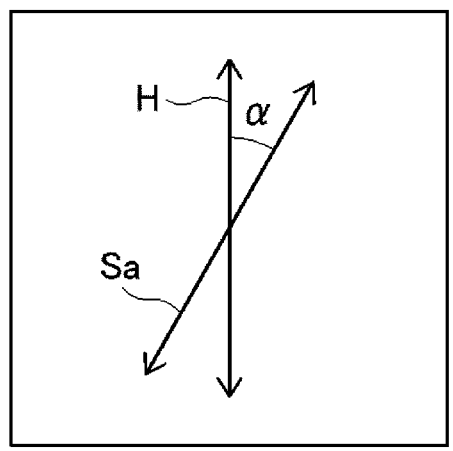
FIG. 9 is a schematic diagram for explaining a method of forming an alignment film.

On the surface of the alignment film formed on the cellulose acylate film 1, rubbing treatment (rayon cloth, pressure: 0.1 kgf (0.98 N), rotation speed: 1000 rpm (revolutions per minute), transport speed: 10 m/min, the number of reciprocating cycles: 1) was performed in a direction rotated 45° clockwise with respect to the longitudinal direction of the cellulose acylate film 1 as viewed from the alignment film surface, as schematically illustrated in FIG. 9.

In FIG. 9, H is the longitudinal direction of the cellulose acylate film 1, the angle α is 45°, and Sa is the direction of rubbing treatment.

The phase difference layer-forming composition was applied to the rubbed surface of the alignment film on the cellulose acylate film 1 by using a wire bar. The coating was then dried, placed on a hot plate at 50° C., and irradiated with ultraviolet light in an environment with an oxygen concentration of 1000 ppm or less by using an electrodeless lamp "D bulb" (60 mW/cm²) manufactured by Fusion UV Systems for 6 seconds to fix the liquid crystal phase, thereby obtaining a λ/4 layer (λ/4 phase difference layer) serving as a polarization conversion layer.

The in-plane retardation Re of the phase difference layer was measured using an AxoScan (manufactured by Axometrics) and found to be 142 nm.

Formation of Selective Reflection Layer

To the surface of the phase difference layer formed, the narrow-band cholesteric liquid crystal layer-forming composition 1 was applied at room temperature using a wire bar so as to have a dry thickness of 4 μm, thereby forming a coating layer. The coating layer was dried at room temperature for 30 seconds, heated in an atmosphere at 85° C. for 2 minutes, and then UV (ultraviolet) irradiated in an environment with an oxygen concentration of 1000 ppm or less at 60° C. using a Fusion D bulb (lamp with 90 mW/cm²) at an output of 60% for 6 to 12 seconds to fix the cholesteric liquid crystalline phase, thereby obtaining a narrow-band cholesteric liquid crystal layer having a thickness of 4 μm.

Next, the same process was repeatedly performed on the surface of the obtained cholesteric liquid crystal layer by further using the narrow-band cholesteric liquid crystal layer-forming composition 2 to obtain a narrow-band cholesteric liquid crystal layer having a thickness of 4 μm.

Next, the same process was repeatedly performed on the surface of the obtained cholesteric liquid crystal layer by further using the narrow-band cholesteric liquid crystal layer-forming composition 3 to obtain a narrow-band cholesteric liquid crystal layer having a thickness of 4 μm.

In this manner, a laminate A having the cellulose acylate film 1 having the alignment film, the phase difference layer, and the selective reflection layer constituted by the three narrow-band cholesteric liquid crystal layers was obtained.

The reflection spectrum of the laminate A was measured with a spectrophotometer (manufactured by JASCO Corporation, V-670). The reflection spectrum obtained had selective reflection center wavelengths at 450 nm, 530 nm, and 630 nm at an incidence angle of 45°.

The reflection spectrum obtained by the measurement with a spectrophotometer was quantified. From a difference between wavelengths on the short-wavelength side and the long-wavelength side at an average reflectivity of maximum and minimum reflectivities of each color, the half-width of reflected light of blue light, the half-width of reflected light of green light, and the half-width of reflected light of red light at an incidence angle of 45° were determined.

The half-width of reflected light of blue light at an incidence angle of 45° was 33 nm, the half-width of reflected light of green light at an incidence angle of 45° was 40 nm, and the half-width of reflected light of red light at an incidence angle of 45° was 46 nm.

The laminate A produced was bonded to 2 mm thick glass with an OCA (manufactured by Nichieikako Co., Ltd., MHM-UHV 15). The bonding was performed with the cholesteric liquid crystal layers (selective reflection layer) facing the glass. This glass was for serving as a substrate of a reflection member.

Thus, a reflection member having a layer structure of glass/OCA/narrow-band cholesteric liquid crystal layers/λ/4 layer/interference suppression layer (TAC) was produced.

Example 2

A reflection member was produced in the same manner as in Example 1 except that the phase difference layer (λ/4 layer) serving as a polarization conversion layer was not formed. The layer structure of the reflection member produced is as follows.

Glass/OCA/Narrow-Band Cholesteric Liquid Crystal Layers/Interference Suppression Layer (TAC)

Example 3

Optical Rotation Layer-Forming Composition

The following components were mixed to prepare an optical rotation layer-forming composition having the following composition.

| Optical rotation layer-forming composition | |
|---|---|
| Mixture 1 | 100 parts by mass |
| Alignment controlling agent 1 | 0.05 parts by mass |
| Alignment controlling agent 3 | 0.02 parts by mass |
| Dextrorotatory chiral agent LC756 (manufactured by BASF) | 1.69 parts by mass |
| Polymerization initiator IRGACURE OXE01 (manufactured by BASF) | 1.0 part by mass |
| Solvent (methyl ethyl ketone) | an amount to give a solute concentration of 20 mass % |

A reflection member was produced in the same manner as in Example 1 except that this optical rotation layer-forming composition was used instead of the phase difference layer-forming composition, and an optical rotation layer serving as a polarization conversion layer was formed.

The thickness d of a helical structure can be expressed as "pitch P of helical structure×pitch number". As described above, the pitch P of a helical structure refers to the length of one pitch in the helical structure. In a cholesteric liquid crystal layer, a selective reflection center wavelength λ is equal to "length P of one pitch×in-plane average refractive index n" (λ=P×n). Therefore, the pitch P is expressed as "selective reflection center wavelength λ/in-plane average refractive index n" (P=λ/n).

Hence, the polarization conversion layer-forming composition was prepared so as to have a selective reflection center wavelength λ of 1550 nm when formed into a cholesteric liquid crystal layer, and the coating thickness was set to 0.7 μm so that the pitch number would be 0.7.

The layer structure of the reflection member produced is as follows.

Glass/OCA/Narrow-Band Cholesteric Liquid Crystal Layers/Optical Rotation Layer/Interference Suppression Layer (TAC)

Example 4

On the basis of a method described in JP1997-506837A (JP-H9-506837A), a linearly polarized light reflecting plate was produced by forming 2,6-polyethylene naphthalate (PEN) and a copolyester (coPEN) of naphthalate 70/terephthalate 30 with the thickness of each layer being adjusted so as to provide selective reflection center wavelengths of 450 nm, 530 nm, and 630 nm at an incidence angle of 45° and a reflectivity of 40%.

To achieve reflected light in a narrow band, the linearly polarized light reflecting plate was adjusted such that the difference in average refractive index between PEN and coPEN was about 0.1.

A reflection member was produced in the same manner as in Example 1 except that the λ/4 layer and the cholesteric liquid crystal layers were not formed on the cellulose acylate film 1 and the linearly polarized light reflecting plate was bonded using an OCA. The layer structure of the reflection member produced is as follows.

Glass/OCA/Narrow-Band Linearly Polarized Light Reflecting Plate/OCA/Interference Suppression Layer (TAC)

Example 5

Preparation of Hard Coat Layer Composition

The following components were mixed so as to have the following composition to prepare a hard coat layer composition having a solid concentration of about 51 mass %.

| Hard coat layer composition | |
|---|---|
| Dipentaerythritol polyacrylate: A-9550W (manufactured by Shin-Nakamura Chemical Co., Ltd.) (hexafunctional) | 44.8 parts by mass |
| Alkylphenone photopolymerization initiator (IRGACURE 184, manufactured by BASF) | 4 parts by mass |
| 3,4-Epoxycyclohexylmethyl methacrylate: CYCLOMER M100 (manufactured by Daicel Corporation, molecular weight: 196) | 22.5 parts by mass |
| Compound 1 | 0.80 parts by mass |
| Polymeric surfactant (manufactured by DIC Corporation, B1176) | 0.05 parts by mass |
| Spherical silica particles (manufactured by Nissan Chemical Industries, Ltd., MEK-AC-2140Z, average particle size: 10 to 20 nm) | 8.08 parts by mass |
| Benzotriazole ultraviolet absorber (Tinuvin928, manufactured by BASF) | 1.15 parts by mass |
| Silica particle dispersion (MiBK solution concentration: 5%) | 13 parts by mass |

The solvent of the silica particle dispersion was prepared at a ratio of MEK:MiBK:methyl acetate = 32:38:30.

Compound 1 was synthesized by a method described in Example 1 of JP4841935B.

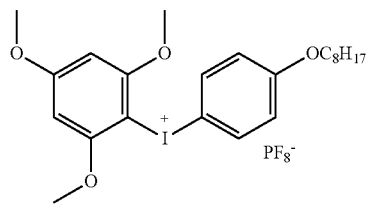

Compound 1

Formation of Hard Coat Layer

A hard coat layer was formed on the surface of the interference suppression layer of the reflection member produced in Example 1 by using the prepared hard coat layer composition.

Specifically, the hard coat layer composition was applied using a bar at a transport speed of 10 m/min, dried at 60° C. for 150 seconds, and then further irradiated with ultraviolet light at an irradiance of 400 mW/cm² and a dose of 500 mJ/cm² under nitrogen purge at an oxygen concentration of about 0.1 vol % by using an air-cooled metal halide lamp (manufactured by Eye Graphics Co., Ltd.) of 160 W/cm² to cure the coating layer, thereby forming a hard coat layer.

Thus, a reflection member having the following layer structure, which is the same as that of Example 1 except having the hard coat layer on the surface of the interference suppression layer, was produced.

Glass/OCA/Narrow-Band Cholesteric Liquid Crystal Layers/λ/4 Layer/Interference Suppression Layer (TAC)/Hard Coat Layer Thickness of Hard Coat Layer The thickness of the hard coat layer was measured using a contact thickness meter.

Specifically, first, the thickness of the reflection member of Example 5 having the hard coat layer was measured using the contact thickness meter, and the thickness of the reflection member of Example 1 was measured in the same manner. Subsequently, the thickness of the reflection member of Example 1 without a hard coat layer was subtracted from the thickness of the reflection member of Example 5 having the hard coat layer to calculate the thickness of the hard coat layer. The thickness of the hard coat layer was 6.0 µm.

Example 6

A reflection member was produced in the same manner as in Example 1 except that the thickness of a cellulose acylate film (TAC) serving as an interference suppression layer was 12 µm.

Example 7

A reflection member was produced in the same manner as in Example 1 except that the thickness of a cellulose acylate film (TAC) serving as an interference suppression layer was 25 µm.

Example 8

A reflection member was produced in the same manner as in Example 1 except that the thickness of a cellulose acylate film (TAC) serving as an interference suppression layer was 100 µm.

The layer structure of the reflection members of these Examples is as follows.

Glass/OCA/Narrow-Band Cholesteric Liquid Crystal Layers/λ/4 Layer/Interference Suppression Layer (TAC)

Example 9

After the laminate A was produced in the same manner as in Example 1, the cellulose acylate film 1 was peeled off.

To a laminate of a λ/4 layer and three cholesteric liquid crystal layers, as obtained by peeling off the cellulose acylate film 1, a 1 mm thick glass plate serving as an interference suppression layer was bonded using an OCA. The bonding was performed with the λ/4 layer and the glass plate facing each other.

The subsequent steps were performed in the same manner as in Example 1 to produce a reflection member. The layer structure of the reflection member produced is as follows.

Glass/OCA/Narrow-Band Cholesteric Liquid Crystal Layers/λ/4 Layer/OCA/Glass

Example 10

A reflection member was produced in the same manner as in Example 1 except that the λ/4 layer and the cholesteric liquid crystal layers (selective reflection layer) were formed in reverse order. The layer structure of the reflection member produced is as follows.

Glass/OCA/λ/4 Layer/Narrow-Band Cholesteric Liquid Crystal Layers/Interference Suppression Layer (TAC)

Example 11

Cholesteric Liquid Crystal Layer-Forming Compositions 4, 5, and 6

By mixing the following components, a cholesteric liquid crystal layer-forming composition 4 for forming a cholesteric liquid crystal layer having a selective reflection center wavelength of 450 nm at an incidence angle of 45°, a cholesteric liquid crystal layer-forming composition 5 for forming a cholesteric liquid crystal layer having a selective reflection center wavelength of 530 nm at an incidence angle of 45°, and a cholesteric liquid crystal layer-forming composition 6 for forming a cholesteric liquid crystal layer having a selective reflection center wavelength of 630 nm at an incidence angle of 45° were prepared.

| Cholesteric liquid crystal layer-forming compositions 4, 5, and 6 | |
| --- | --- |
| Mixture 1 | 100 parts by mass |
| Alignment controlling agent 1 | 0.05 parts by mass |
| Alignment controlling agent 3 | 0.02 parts by mass |
| Dextrorotatory chiral agent LC756 (manufactured by BASF) | adjusted according to a target reflection wavelength |
| Polymerization initiator (IRGACURE OXE01, manufactured by BASF) | 1.0 part by mass |
| Solvent (methyl ethyl ketone) | an amount to give a solute concentration of 20 mass % |

By adjusting the amount of the dextrorotatory chiral agent LC756 in this composition, the cholesteric liquid crystal layer-forming compositions 4 to 6 were prepared.

Using each of the cholesteric liquid crystal layer-forming compositions 4 to 6, a single cholesteric liquid crystal layer having a thickness of 4 μm was formed on a temporary support in the same manner as in the production of a reflection member described above, and the reflection characteristics of light in the visible range were evaluated. The cholesteric liquid crystal layers formed were all right-handed circularly polarized light reflection layers. The selective reflection center wavelength at an incidence angle of 45° was as follows: the cholesteric liquid crystal layer-forming composition 4, 450 nm; the cholesteric liquid crystal layer-forming composition 5, 530 nm; the cholesteric liquid crystal layer-forming composition 6, 630 nm.

A reflection member was produced in the same manner as in Example 1 except that these cholesteric liquid crystal layer-forming compositions 4 to 6 were used to form a selective reflection layer (cholesteric liquid crystal layers). The layer structure of the reflection member produced is as follows.

Glass/OCA/Cholesteric Liquid Crystal Layers/λ/4 Layer/Interference Suppression Layer (TAC)

Comparative Example 1

After a reflection member was produced in the same manner as in Example 1, a λ/4 layer and an interference suppression layer were peeled off to produce a reflection member. The layer structure of the reflection member produced is as follows.

Glass/OCA/Narrow-Band Cholesteric Liquid Crystal Layers

Comparative Example 2

After a reflection member was produced in the same manner as in Example 1, an interference suppression layer was peeled off to produce a reflection member. The layer structure of the reflection member produced is as follows.

Glass/OCA/Narrow-Band Cholesteric Liquid Crystal Layers/λ/4 Layer

Comparative Example 3

In the same manner as in Example 1, three narrow-band cholesteric liquid crystal layers (selective reflection layer) were formed on the cellulose acylate film 1 having an alignment film formed thereon.

Subsequently, a glass plate was bonded using an OCA in the same manner as in Example 1 with the interference suppression layer (TAC) facing the glass plate. The layer structure of the reflection member produced is as follows.

Glass/OCA/Interference Suppression Layer (TAC)/Narrow-Band Cholesteric Liquid Crystal Layers

Comparative Example 4

A reflection member was produced in the same manner as in Example 1 except that the thickness of a cellulose acylate film (TAC) serving as an interference suppression layer was 8 μm.

The layer structure of the reflection member of this Example is as follows.

Glass/OCA/Narrow-Band Cholesteric Liquid Crystal Layers/λ/4 Layer/Interference Suppression Layer (TAC)

For each of the reflection members produced, the in-plane retardation Re of the interference suppression layer and the half-width of reflection of the cholesteric liquid crystal layers were measured in the same manner as in Example 1.

Evaluation

Wavelength Dependence of p-Polarized Light Reflectivity

Figure 10:
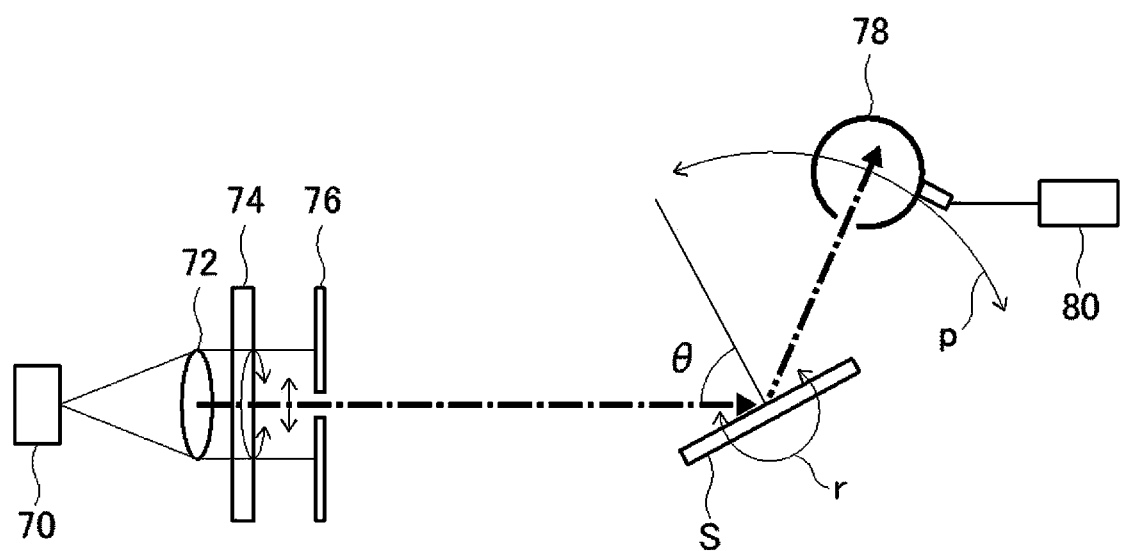
FIG. 10 is a schematic diagram for explaining a method of measuring the wavelength dependence of p-polarized light reflectivity.

The reflection members produced were evaluated for the wavelength dependence of p-polarized light reflectivity by using an apparatus schematically illustrated in FIG. 10.

As described above, the longer the wavelength of a light beam, the more likely it is that a decrease in reflectivity due to wavelength variation occurs. Accordingly, an LED that emits a light beam having a center wavelength of 630 nm and a half-width of 15 nm was used as a light source 70.

The light beam (chain line) emitted from the light source 70 was converted into parallel light by a collimator lens 72, converted into p-polarized light by a polarizer 74, and passed through a regulation plate 76 having a circular opening with a diameter of 1 mm to be incident on a reflection member S serving as a sample. The reflected light from the reflection member S was allowed to be incident on an integrating sphere 78, and the amount of the reflected light was measured with a spectroscope 80.

The reflection member S was disposed such that the longitudinal direction of the cellulose acylate film 1 (TAC) at the time of production was parallel to the polarization direction of p-polarized light. That is, the slow axis of the λ/4 layer was at 45° with respect to the polarization direction of p-polarized light.

In the reflection member S, the interference suppression layer (TAC, glass) was used as the plane of incidence of the light beam. In Example 5, the hard coat layer was used as the plane of incidence of the light beam, in Comparative Examples 1 and 3, the cholesteric liquid crystal layers were used as the plane of incidence of the light beam, and in Comparative Example 2, the λ/4 layer was used as the plane of incidence of the light beam.

The measurement was performed while varying the incidence angle θ of the light beam (chain line) on the reflection member S from 40° to 50° in increments of 1° by swinging the reflection member S as indicated by an arrow r in the figure. The position of the integrating sphere 78 was moved as required, as indicated by an arrow p in the figure.

In a selective reflection layer such as a cholesteric liquid crystal layer, the reflection wavelength becomes shorter as the incidence angle with respect to the normal increases, which is what is called a blue shift (short-wave shift). Using this, the wavelength variation of the light beam was simulated by varying the incidence angle θ of the light beam on the reflection member S.

The variation in reflectivity was calculated assuming that the maximum amount of reflected light was 100%.

The wavelength dependence of p-polarized light reflectivity was evaluated using the maximum variation in reflectivity according to the following evaluation criteria.

A: The variation in reflectivity is less than 2%.
B+: The variation in reflectivity is 2% or more and less than 3%.
B: The variation in reflectivity is 3% or more and less than 5%.
C: The variation in reflectivity is 5% or more.
Grade A is a level at which a HUD screen image is hardly affected if the wavelength of the light beam has been changed due to heat.
Grade B+ is a level at which the tint of a HUD screen image slightly changes when the wavelength of the light beam has been changed due to heat.
Grade B is a level at which the tint of a HUD screen image changes at a practically acceptable level when the wavelength of the light beam has been changed due to heat.
Grade C is a level at which the tint of a HUD screen image changes when the wavelength of the light beam has been changed due to heat.

Evaluation of p-Polarized Light Reflectivity p-polarized light was allowed to be incident from a direction of 45° with respect to the direction normal to the reflection member, and the reflectivity spectrum of specularly reflected light (in a direction of 45° with respect to the normal direction opposite to the incident direction in the incidence plane) was measured with a spectrophotometer (manufactured by JASCO Corporation, V-670).

The reflection member S was disposed such that the longitudinal direction of the cellulose acylate film 1 (TAC) at the time of production was parallel to the polarization direction of p-polarized light. That is, the slow axis of the λ/4 layer was at 45° with respect to the polarization direction of p-polarized light. In the reflection member S, the interference suppression layer (TAC, glass) was used as the plane of incidence of the light beam. In Example 5, the hard coat layer was used as the plane of incidence of the light beam, in Comparative Examples 1 and 3, the cholesteric liquid crystal layers were used as the plane of incidence of the light beam, and in Comparative Example 2, the λ/4 layer was used as the plane of incidence of the light beam. These conditions are the same as those of the above-described "evaluation of wavelength dependence of p-polarized light reflectivity".

In accordance with JIS R 3106, a projection image reflectivity was calculated by multiplying a reflectivity by a coefficient based on luminosity and by emission spectra of a laser imager at 450 nm, 515 nm, and 633 nm at wavelengths at 10-nm intervals in the range of 380 to 780 nm, and evaluated as brightness. The brightness was evaluated according to the following evaluation criteria.

A: 70% or more
B: 30% or more and less than 70%
C: less than 30%
Grade A is a level at which the light beam is mostly reflected and a screen image can be seen in the p-polarized light reflection system of a HUD.
Grade B is a level at which a screen image is difficult to see in the p-polarized light reflection system of a HUD although the light beam is partially reflected, but is a practically level.
Grade C is a level at which the light beam is hardly reflected and a screen image cannot be seen in the p-polarized light reflection system of a HUD.

Evaluation of Sunlight Cut

Natural light was allowed to be incident on the interference suppression layer (TAC) surface of the reflection member from a direction of 45° with respect to the direction normal to the interference suppression layer, and the transmittance spectrum of transmitted light was measured with a spectrophotometer (manufactured by JASCO Corporation, V-670). In Example 5, the hard coat layer was used as the plane of incidence of natural light, in Comparative Examples 1 and 3, the cholesteric liquid crystal layers were used as the plane of incidence of natural light, and in Comparative Example 2, the λ/4 layer was used as the plane of incidence of natural light.

A natural light transmittance was calculated by multiplying a reflectivity by a coefficient based on luminosity and by an emission spectrum of a D65 light source at wavelengths at 10-nm intervals in the range of 380 to 780 nm, and evaluated as the amount of sunlight cut. The effect of the amount of sunlight cut was evaluated according to the following evaluation criteria.

A: transmittance of 60% or more
B: transmittance of 30% or more and less than 60%
C: transmittance of less than 30%
Grade A is a level at which visible light is mostly transmitted and sunlight slightly returns to the members upstream of the reflection member (the upstream side of the path of projection light).
Grade B is a level at which visible light is partially transmitted and sunlight partially returns to the members upstream of the reflection member.
Grade C is a level at which visible light is slightly transmitted and sunlight mostly returns to the members upstream of the reflection member.

The results are shown in the table below.

TABLE 1

| | Structure (right side is light incident side) | Constituent element | | | | | | | | | Evaluation | | |
|---|---|---|---|---|---|---|---|---|---|---|---|---|---|
| | | Interference suppression layer (TAC glass) | | | | Reflection half-width | | | Polarization conversion layer | | Wavelength dependence | P-polarized light reflectivity | Sunlight cut |
| | | Type | Thickness | Re | Refractive index | Blue light | Green light | Red light | Type | Conditions | | | |
| Example 1 | Glass/OCA/narrow-band cholesteric liquid crystal layers/λ/4 layer/TAC | TAC | 40 μm | 2 nm | 1.49 | 33 nm | 40 nm | 46 nm | λ/4 | Re: 142 nm slow axis: 45° | A | A | A |
| Example 2 | Glass/OCA/narrow-band cholesteric liquid crystal layers/FAC | TAC | 40 μm | 2 nm | 1.49 | 33 nm | 40 nm | 46 nm | None | None | A | B | A |
| Example 3 | Glass/OCA/narrow-band cholesteric liquid crystal layers/optical rotation layer/TAC | TAC | 40 μm | 2 nm | 1.49 | 33 nm | 40 nm | 46 nm | Helical | See margin | A | A | A |
| Example 4 | Glass/OCA/narrow-band linearly polarized light reflecting layer/OCA/TAC | TAC | 40 μm | 2 nm | 1.49 | 33 nm | 40 nm | 46 nm | None | None | A | A | A |
| Example 5 | Glass/OCA/narrow-band cholesteric liquid crystal layers/λ/4 layer/TAC/hard coat layer | TAC | 40 μm | 2 nm | 1.49 | 33 nm | 40 nm | 46 nm | λ/4 | Re: 142 nm slow axis: 45° | A | A | A |
| Example 6 | Glass/OCA/narrow-band cholesteric liquid crystal layers/λ/4 layer/TAC | TAC | 12 μm | 1 nm | 1.49 | 33 nm | 40 nm | 46 nm | λ/4 | Re: 142 nm slow axis: 45° | B | A | A |
| Example 7 | Glass/OCA/narrow-band cholesteric liquid crystal layers/λ/4 layer/TAC | TAC | 25 μm | 1 nm | 1.49 | 33 nm | 40 nm | 46 nm | λ/4 | Re: 142 nm slow axis: 45° | B+ | A | A |
| Example 8 | Glass/OCA/narrow-band cholesteric liquid crystal layers/λ/4 layer/TAC | TAC | 100 μm | 2 nm | 1.49 | 33 nm | 40 nm | 46 nm | λ/4 | Re: 142 nm slow axis: 45° | A | A | A |
| Example 9 | Glass/OCA/narrow-band cholesteric liquid crystal layers/λ/4 layer/OCA/glass | Glass | 1 mm | 0 nm | 1.49 | 33 nm | 40 nm | 46 nm | λ/4 | Re: 142 nm slow axis: 45° | A | A | A |
| Example 10 | Glass/OCA/λ/4 layer/narrow-band cholesteric liquid crystal layers/TAC | TAC | 40 μm | 2 nm | 1.49 | 33 nm | 40 nm | 46 nm | λ/4 | Re: 142 nm slow axis: 45° | A | B | A |
| Example 11 | Glass/OCA/cholesteric liquid crystal layers/λ/4 layer/TAC | TAC | 40 μm | 2 nm | 1.49 | 57 nm | 67 nm | 80 nm | λ/4 | Re: 142 nm slow axis: 45° | A | A | B |
| Comparative Example 1 | Glass/OCA/narrow-band cholesteric liquid crystal layers | None | None | None | 1.49 | 33 nm | 40 nm | 46 nm | None | None | C | B | B |
| Comparative Example 2 | Glass/OCA/narrow-band cholesteric liquid crystal layers/λ/4 layer | None | None | None | 1.49 | 33 nm | 40 nm | 46 nm | λ/4 | Re: 142 nm slow axis: 45° | C | A | A |
| Comparative Example 3 | Glass/OCA/TAC/narrow-band cholesteric liquid crystal layers | TAC | 40 μm | 2 nm | 1.49 | 33 nm | 40 nm | 46 nm | None | None | C | B | A |
| Comparative Example 4 | Glass/OCA/narrow-band cholesteric liquid crystal layers/λ/4 layer/TAC | TAC | 8 μm | 1 nm | 1.49 | 33 nm | 40 nm | 46 nm | λ/4 | Re: 142 nm slow axis: 45° | C | A | A |

The polarization conversion layer in Example 3 is an optical rotation layer having a helical structure.
The layer has a helical pitch number of 0.7, a thickness of 0.7 μm, and a λ of 1550 nm.

As shown in the above table, according to the projectors of the present invention using a reflection member having an interference suppression layer having a thickness of 10 µm or more, the decrease in reflectivity of the reflection member due to a wavelength variation of a light beam (projection light) can be suppressed, thus suitably suppressing a variation in tint and a decrease in brightness of a screen image projected by a HUD.

In addition, as shown by Examples 1 to 5 and Examples 8 to 11, when the interference suppression layer has a thickness of 40 µm or more, the decrease in reflectivity of the reflection member due to a wavelength variation of a light beam can be more suitably suppressed. As shown by Example 1 to Example 3 and Example 10, the p-polarized light reflectivity can be improved by providing a polarization conversion layer such as a λ/4 plate or an optical rotation layer such that the polarization conversion layer is closer to the light incident side than the cholesteric liquid crystal layers serving as a selective reflection layer are. As shown by Example 4, a linearly polarized light reflection layer can also be suitably used as a selective reflection layer. Furthermore, as shown by Example 1 and Example 11, when the reflection half-widths of the cholesteric liquid crystal layers are all 70 nm or less, a high sunlight cutting effect is produced.

By contrast, in Comparative Example 1 and Comparative Example 2, each having no interference suppression layer, Comparative Example 3, in which the cholesteric liquid crystal layers are located closer to the light beam incident side than the interference suppression layer is, and Comparative Example 4, in which the thickness of the interference suppression layer is insufficient, the decrease in reflectivity of the reflection member due to a wavelength variation of a light beam is large, and a variation in tint of a screen image projected by a HUD has occurred.

From the above results, the advantageous effects of the present invention are apparent.

The present invention can be suitably used for, for example, an in-vehicle HUD.

REFERENCE SIGNS LIST 10 (HUD) projector
12 screen image forming unit
14 intermediate image screen
16 reflection member
18 concave mirror
20 dashboard
24 transmission window
26 windshield glass
30, 70 light source
30R R light source
30G G light source
30B B light source
32 mirror
32R R mirror
32G G mirror
32B B mirror
34 polarizing plate
36 light deflector
40 substrate
42 adhesive layer
46 selective reflection layer
48 polarization conversion layer
50 interference suppression layer
60 half-mirror film
62 intermediate film
64 glass plate
72 collimator lens
74 polarizing plate
76 regulation plate
78 integrating sphere
80 spectroscope
S sample (reflection member)

What is claimed is:

1. A head-up display projector comprising:
a light source for forming a projection image;
a reflection member disposed downstream of the light source having a selective reflection layer that reflects visible light and is constituted by two or more layers having selective reflection center wavelengths different from each other and an interference suppression layer that has a thickness of 10 µm or more; and
a light reflection element disposed downstream of the reflection member,
wherein in the reflection member, the interference suppression layer is located closer to a side on which light from the light source is incident than the selective reflection layer is.

2. The head-up display projector according to claim 1, wherein reflected light of visible light incident on the selective reflection layer at an incidence angle of 45° has a half-width of 70 nm or less.

3. The head-up display projector according to claim 2, wherein the light source emits light having a half-width of 20 nm or less.

4. The head-up display projector according to claim 2, wherein the interference suppression layer has a thickness of 40 µm or more.

5. The head-up display projector according to claim 4, wherein the interference suppression layer has a thickness of more than 40 µm.

6. The head-up display projector according to claim 2, wherein the selective reflection layer is a cholesteric liquid crystal layer formed by fixing a cholesteric liquid crystalline phase.

7. The head-up display projector according to claim 2, wherein the reflection member has a polarization conversion layer that converts linearly polarized light into circularly polarized light.

8. The head-up display projector according to claim 7, wherein the polarization conversion layer has a retardation Re in a plane direction of 100 to 450 nm.

9. The head-up display projector according to claim 7, wherein the polarization conversion layer is a layer formed by fixing a liquid crystal compound twistedly aligned at a twist angle of less than 360° along a helical axis extending in a thickness direction.

10. The head-up display projector according to claim 7, wherein the polarization conversion layer is disposed between the interference suppression layer and the selective reflection layer.

11. The head-up display projector according to claim 2, wherein the selective reflection layer is a linearly polarized light reflection layer.

12. The head-up display projector according to claim 1, wherein the light source emits light having a half-width of 20 nm or less.

13. The head-up display projector according to claim 1, wherein the interference suppression layer has a thickness of 40 µm or more.

14. The head-up display projector according to claim 13, wherein the interference suppression layer has a thickness of more than 40 µm.

15. The head-up display projector according to claim 1, wherein the selective reflection layer is a cholesteric liquid crystal layer formed by fixing a cholesteric liquid crystalline phase.

16. The head-up display projector according to claim 1, wherein the reflection member has a polarization conversion layer that converts linearly polarized light into circularly polarized light.

17. The head-up display projector according to claim 16, wherein the polarization conversion layer has a retardation Re in a plane direction of 100 to 450 nm.

18. The head-up display projector according to claim 16, wherein the polarization conversion layer is a layer formed by fixing a liquid crystal compound twistedly aligned at a twist angle of less than 360° along a helical axis extending in a thickness direction.

19. The head-up display projector according to claim 16, wherein the polarization conversion layer is disposed between the interference suppression layer and the selective reflection layer.

20. A head-up display projector comprising:
a light source for forming a projection image; and
a reflection member having a selective reflection layer that reflects visible light and is constituted by two or more layers having selective reflection center wavelengths different from each other and an interference suppression layer that has a thickness of 10 μm or more,
wherein in the reflection member, the interference suppression layer is located closer to a side on which light from the light source is incident than the selective reflection layer is, and
the selective reflection layer is a linearly polarized light reflection layer.

* * * * *